(12) United States Patent
Takaoka et al.

(10) Patent No.: US 8,136,399 B2
(45) Date of Patent: Mar. 20, 2012

(54) ANGULAR RATE SENSOR WITH VIBRATOR

(75) Inventors: Masaki Takaoka, Kyoto (JP); Daisuke Kaminishi, Kyoto (JP); Yoshikazu Fujimori, Kyoto (JP)

(73) Assignee: Rohm Co., Ltd., Kyoto-fu (JP)

( * ) Notice: Subject to any disclaimer, the term of this patent is extended or adjusted under 35 U.S.C. 154(b) by 557 days.

(21) Appl. No.: 12/342,337

(22) Filed: Dec. 23, 2008

(65) Prior Publication Data
US 2009/0173156 A1   Jul. 9, 2009

(30) Foreign Application Priority Data

Dec. 26, 2007   (JP) ................... P2007-334015
Jan. 25, 2008   (JP) ................... P2008-015374
Dec. 9, 2008    (JP) ................... P2008-313435

(51) Int. Cl.
*G01P 9/04*   (2006.01)

(52) U.S. Cl. .................... 73/504.15; 73/504.12

(58) Field of Classification Search ............ 73/504.12, 73/504.04, 504.15, 504.16, 514.34, 514.33, 73/514.29
See application file for complete search history.

(56) References Cited

U.S. PATENT DOCUMENTS

| | | | | |
|---|---|---|---|---|
| 3,143,889 A | * | 8/1964 | Simmons et al. | 73/504.12 |
| 4,689,992 A | * | 9/1987 | Strachan | 73/504.12 |
| 5,824,903 A | * | 10/1998 | Nakamura et al. | 73/514.34 |
| 6,250,158 B1 | * | 6/2001 | Stewart | 73/504.14 |
| 6,722,622 B2 | * | 4/2004 | Mori et al. | 248/638 |
| 6,810,740 B2 | * | 11/2004 | Tabota | 73/514.34 |
| 6,907,783 B2 | * | 6/2005 | Fujimoto | 73/504.14 |
| 7,140,249 B2 | * | 11/2006 | Matsunaga et al. | 73/504.12 |
| 7,401,516 B2 | * | 7/2008 | Inaguma et al. | 73/504.15 |

FOREIGN PATENT DOCUMENTS

| | | |
|---|---|---|
| JP | 09-178492 | 7/1997 |
| JP | 2005-227110 | 8/2005 |
| JP | 2005-291858 | 10/2005 |

* cited by examiner

*Primary Examiner* — Helen C. Kwok
(74) *Attorney, Agent, or Firm* — Fish & Richardson P.C.

(57) ABSTRACT

An angular rate sensor includes: a substrate; and a vibrator having a beam part supported in a state of floating from the substrate and a pair of supports formed on the substrate and provided at both ends of the beam part for supporting the beam part. The vibrator includes a piezoelectric film formed in the beam part, a detecting electrode for detecting an angular rate, the detecting electrode being formed on the piezoelectric film so as to extend toward a center portion of the beam part from one end thereof, and a driving electrode for vibrating the vibrator, the driving electrode being formed on the piezoelectric film so as to extend toward the center portion of the beam part from the other end thereof and to be spaced from the detecting electrode.

7 Claims, 22 Drawing Sheets

ANGULAR RATE SENSOR WITH VIBRATOR

CROSS REFERENCE TO RELATED APPLICATIONS AND INCORPORATION BY REFERENCE

This application is based upon and claims the benefit of priority from prior Japanese Patent Application P2007-334015 filed on Dec. 26, 2007, prior Japanese Patent Application P2008-015374 filed on Jan. 25, 2008, and prior Japanese Patent Application P2008-313435 filed on Dec. 9, 2008, the entire contents of which are incorporated by reference herein.

BACKGROUND OF THE INVENTION

1. Field of the Invention

The present invention relates to an angular rate sensor including a piezoelectric film.

2. Description of the Related Art

There has heretofore been known an angular rate sensor including a piezoelectric film and having an MEMS (Micro Electro Mechanical Systems) structure.

Japanese Patent Application Publication No. Hei 9-178492 (hereinafter Patent Document 1) discloses a piezoelectric vibrator including a piezoelectric vibration element, two driving electrodes and two detecting electrodes. The piezoelectric vibration element is supported at four corners in a vibratingly floating state. In a center part of the piezoelectric vibration element, two drive-side vibration branches are formed so as to extend in a predetermined direction, and two detection-side vibration branches are formed so as to extend in a direction opposite to the drive-side vibration branches. The two driving electrodes are for driving the piezoelectric vibration element and are formed on the drive-side vibration branches. The two detecting electrodes are for detecting an angular rate and are formed on the detection-side vibration branches.

In the piezoelectric vibrator described above, when a voltage is applied to the driving electrodes, the drive-side vibration branches are vibrated. By this vibration, the entire piezoelectric vibration element is vibrated. In this state, when the piezoelectric vibrator undergoes a rotational motion, a Coriolis force acts thereon to generate a voltage in the detection-side vibration branches. By detecting the voltage with the detecting electrodes, an angular rate is detected.

Moreover, there has heretofore been known an angular rate sensor including a piezoelectric film and a cantilever vibrator (see Japanese Patent Application Publication No. 2005-291858 (hereinafter Patent Document 2) and Japanese Patent Application Publication No. 2005-227110 (hereinafter Patent Document 3)).

For example, Patent Document 2 discloses an angular rate sensor having a cantilever vibrator with one end supported on a substrate. The vibrator disclosed in Patent Document 2 includes a reference electrode, a piezoelectric body formed on the reference electrode, a driving electrode formed on the piezoelectric body and a pair of detecting electrodes formed on the piezoelectric body so as to sandwich the driving electrode therebetween.

The vibrator disclosed in Patent Document 2 is vibrated at a resonance frequency in a thickness direction by inputting a driving signal between the reference electrode and the driving electrode. In this state, when the vibrator undergoes a rotational motion, the piezoelectric body is vibrated also in a width direction perpendicular to the thickness direction and is thus deformed. Accordingly, the piezoelectric body outputs a detection signal corresponding to an angular rate due to the vibration in the width direction. This voltage is inputted to control means through the pair of detecting electrodes. Thus, the angular rate is detected.

Here, as means for improving the ability to detect the angular rate by the vibrator as described above, there has been known an approach of setting a ratio of resonance frequencies in the thickness and width directions to be "1" by adjusting the thickness and width of the vibrator.

However, in the piezoelectric vibrator disclosed in Patent Document 1, by vibration of the drive-side vibration branches, the entire piezoelectric vibration element is vibrated and the detection-side vibration branches formed on the side opposite to the drive-side vibration branches are thereby vibrated. Therefore, it is required to vibrate the entire piezoelectric vibration element for vibration of the detection-side vibration branches. The piezoelectric vibrator has a problem of a difficulty in largely vibrating the detection-side vibration branches.

Moreover, as to the vibrator disclosed in Patent Document 2, in order to increase a thickness thereof, a time required for a lamination process is increased. Meanwhile, when a width of the vibrator is reduced, an area of a detecting electrode and a volume of a piezoelectric film are reduced. As a result, an output is lowered. For this reason, there are constraints on improvement in the detection ability of the vibrator by setting the thickness and width of the vibrator to be equal to each other, and thus it is difficult to improve the detection ability in that manner. Furthermore, considering future miniaturization of the vibrator and reduction in the thickness of the film, there is a problem that it is more difficult to improve the detection ability of the vibrator by adjusting the width and thickness of the vibrator.

SUMMARY OF THE INVENTION

The present invention has been made to solve the problem described above, and aims to provide an angular rate sensor capable of reducing a parasitic capacitance between a detecting electrode and a driving electrode while largely vibrating a vibrator on a detecting electrode side.

Moreover, the present invention has been made to solve the problem described above, and aims to provide an angular rate sensor whose ability to detect an angular rate can be easily improved.

As one aspect of the present invention, an angular rate sensor includes: a substrate; and a vibrator having a beam part supported in a state of floating from the substrate and a pair of supports formed on the substrate and provided at both ends of the beam part for supporting the beam part. The vibrator includes a piezoelectric film formed in the beam part, a detecting electrode for detecting an angular rate, the detecting electrode formed on the piezoelectric film so as to extend toward a center portion of the beam part from one end thereof, and a driving electrode for vibrating the vibrator, the driving electrode formed on the piezoelectric film so as to extend toward the center portion of the beam part from the other end thereof and to be spaced from the detecting electrode.

As another aspect of the present invention, the supports extend in a direction intersecting with the beam part.

As another aspect of the present invention, a part of each of the supports is supported in a state of floating from the substrate.

As another aspect of the present invention, the supports are bent.

As another aspect of the present invention, an angular rate sensor includes: a substrate; and a cantilever vibrator having a piezoelectric film. The vibrator includes a detector capable of vibration, the detector extending from the substrate and having a detecting electrode for detecting an angular rate formed therein, and a resonance frequency regulator capable of regulating a resonance frequency of the detector, the resonance frequency regulator provided at a front end of the detector.

As another aspect of the present invention, the resonance frequency regulator has a linear shape extending in the same direction as that of the detector.

As another aspect of the present invention, a width of the detector is larger than a width of the resonance frequency regulator.

As another aspect of the present invention, a width of the detector is larger than a thickness of the detector, and a width of the resonance frequency regulator is smaller than a thickness of the resonance frequency regulator.

As another aspect of the present invention, the resonance frequency regulator is provided at a center portion in a width direction of the detector.

As another aspect of the present invention, a plurality of the resonance frequency regulators are provided, and the plurality of resonance frequency regulators are symmetric about a center portion of the detector.

According to the present invention, the beam part is supported at the both ends, the detecting electrode is formed from one end of the beam part, and the driving electrode is formed from the other end of the beam part so as to be spaced from the detecting electrode. Thus, a parasitic capacitance between the detecting electrode and the driving electrode can be reduced. Moreover, when the vibrator is vibrated by the driving electrode, the vibration is easily transmitted to the detecting electrode side. Thus, the vibrator can be largely vibrated.

Moreover, according to the present invention, by providing the resonance frequency regulator at the front end of the detector in the vibrator, the resonance frequency regulator being capable of regulating the resonance frequency of the detector, the resonance frequencies in the width and thickness directions of the entire vibrator can be regulated. Thus, regardless of the width and thickness of the entire vibrator, a ratio of resonance frequencies of the entire vibrator is optimized by the resonance frequency regulator. Accordingly, the ability to detect the angular rate can be easily improved.

DETAILED DESCRIPTION OF THE INVENTION

First Embodiment

Figure 1:
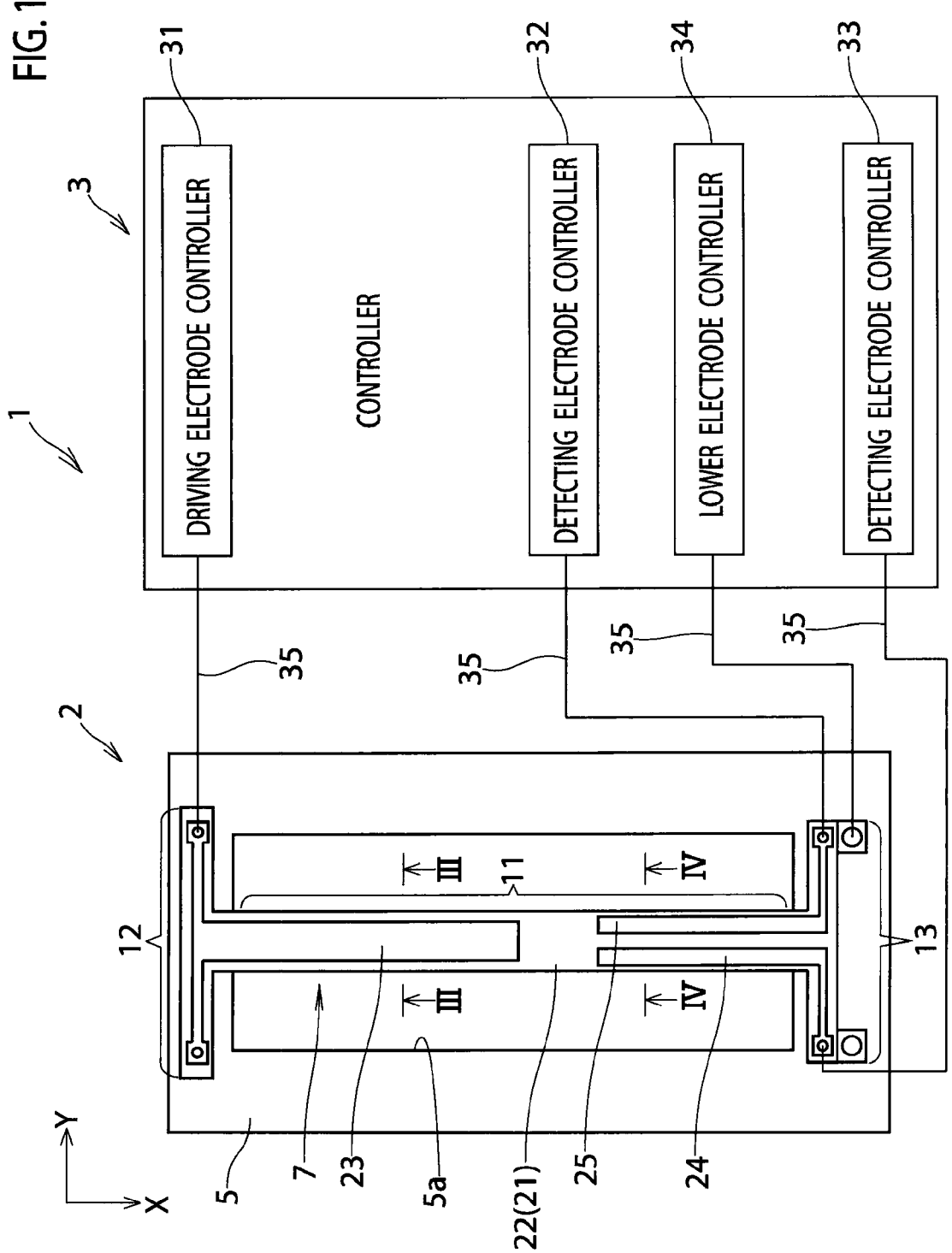
FIG. 1 is a schematic overall diagram of an angular rate sensor according to a first embodiment.
Figure 2:
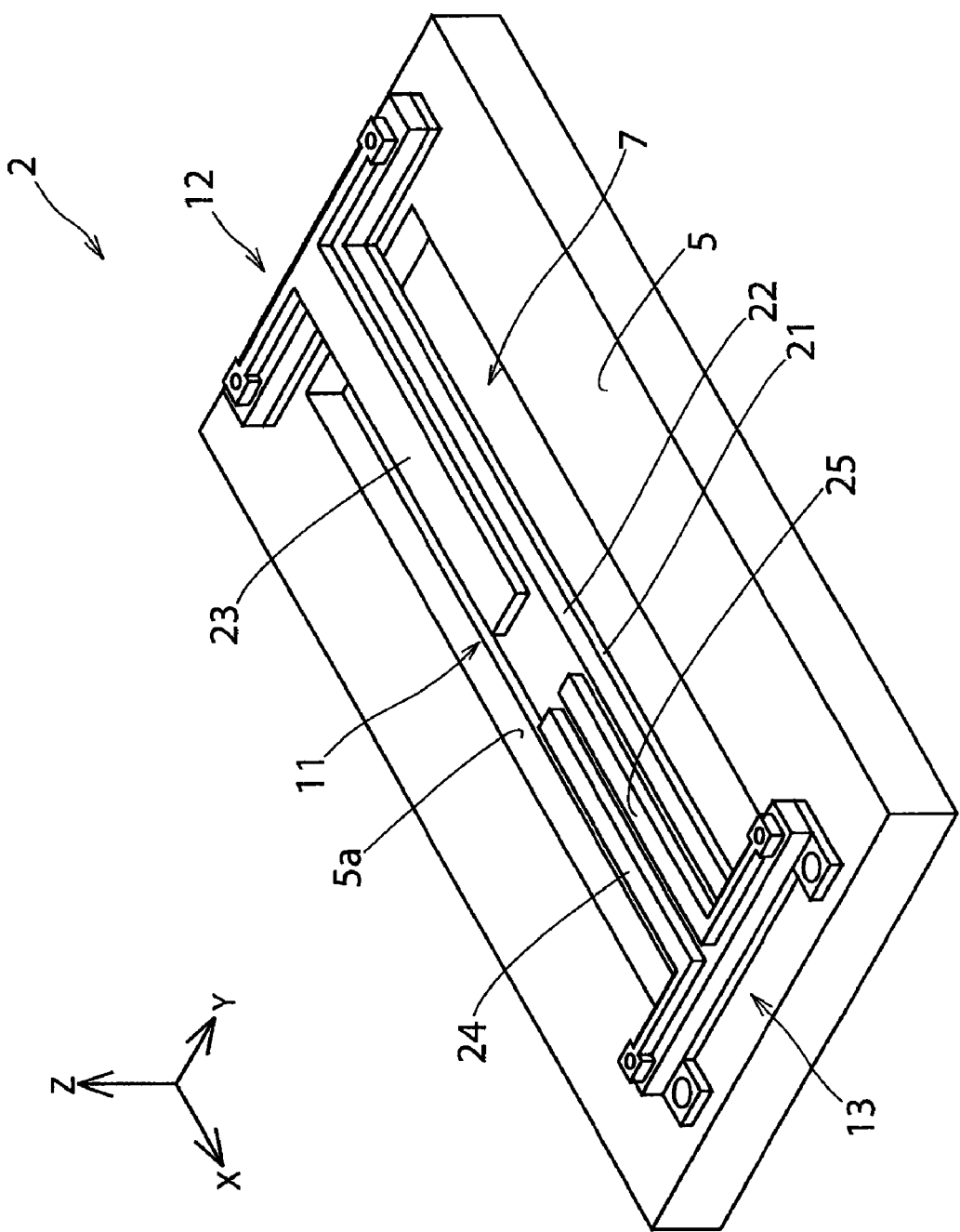
FIG. 2 is a perspective view of an element unit.
Figure 3:
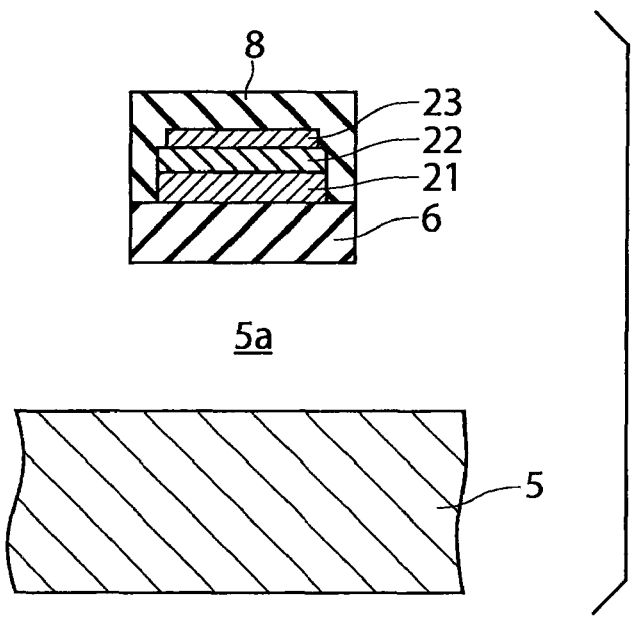
FIG. 3 is a cross-sectional view taken along the line III-III in FIG. 1.
Figure 4:
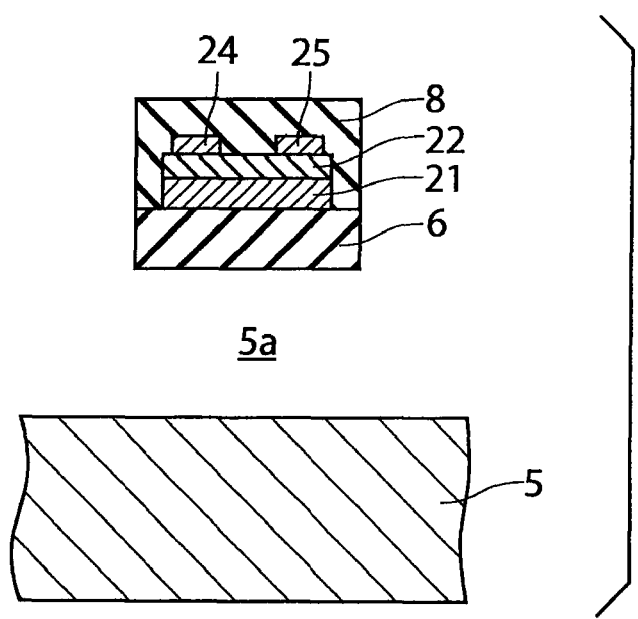
FIG. 4 is a cross-sectional view taken along the line IV-IV in FIG. 1.

With reference to the drawings, a first embodiment of the present invention will be described below. FIG. 1 is a schematic overall diagram of an angular rate sensor according to the first embodiment. FIG. 2 is a perspective view of an element unit. FIG. 3 is a cross-sectional view taken along the line III-III in FIG. 1. FIG. 4 is a cross-sectional view taken along the line IV-IV in FIG. 1.

As shown in FIG. 1, an angular rate sensor 1 according to the first embodiment includes an element unit 2 and a controller 3.

As shown in FIGS. 1 to 4, the element unit 2 includes a semiconductor substrate 5, a lower protective film 6, a vibrator 7 and an upper protective film 8. Note that the lower protective film 6 and the upper protective film 8 are omitted in FIGS. 1 and 2.

The semiconductor substrate 5 is made of silicon having a thickness of about 300 μm. The thickness of the semiconductor substrate 5 can be accordingly changed as long as the thickness allows the substrate to be held in mounting thereof or the like. In a part of the semiconductor substrate 5, a concave part 5a is formed, which has a depth of 50 μm or more (preferably 100 μm or more). Note that the depth of the concave part 5a is not limited to 50 μm or more as long as the depth is not affected by changes of pressure when a beam part 11 of the vibrator 7 to be described later is vibrated.

The lower protective film 6 is for protecting a lower part of the vibrator 7 and for regulating a frequency of the vibrator 7. The lower protective film 6 is made of insulating $SiO_2$ having a thickness of about 1 μm to 4 μm. The lower protective film 6 is formed in an approximately entire area of an upper surface of the semiconductor substrate 5 except for the concave part 5a. Moreover, as shown in FIGS. 3 and 4, above the concave part 5a of the semiconductor substrate 5, the lower protective film 6 is formed so as to cover a lower surface of the vibrator 7. By adjusting the thickness of the lower protective film 6, the frequency of the vibrator 7 can be regulated.

As shown in FIGS. 1 and 2, the vibrator 7 includes the beam part 11 and a pair of supports 12 and 13.

The beam part 11 is formed so as to extend in an X direction. The beam part 11 has a width of about 5 μm and a length of about 500 μm. Both ends of the beam part 11 are supported by the semiconductor substrate 5. The beam part 11 is formed above the concave part 5a of the semiconductor substrate 5. In a Z direction, a space of about 50 μm or more is provided between the beam part 11 and the concave part 5a of the semiconductor substrate 5. Specifically, the beam part 11 is vibratingly supported in a state of floating from the semiconductor substrate 5.

The supports 12 and 13 each extend in a Y direction so as to intersect with the beam part 11. Each of the supports 12 and 13 has a width of about 5 μm and a length of about 100 μm. The supports 12 and 13 are formed integrally at the both ends of the beam part 11 for supporting the beam part 11. Each of the supports 12 and 13 is formed on the semiconductor substrate 5 throughout the length thereof.

As shown in FIGS. 1 to 4, the vibrator 7 has a lower electrode 21, a piezoelectric film 22, a driving electrode 23 and detecting electrodes 24 and 25.

The lower electrode 21 is for equalizing a potential on a lower surface of the piezoelectric film 22. The lower electrode 21 is made of Pt (platinum) having a thickness of about 200 nm. The lower electrode 21 is formed on the lower protective film 6 so as to cover lower surfaces of the beam part 11 and the supports 12 and 13. One edge portion of the lower electrode 21 is formed so as to be exposed from the piezoelectric film 22. The lower electrode 21 is connected to the controller 3 through the exposed portion.

The piezoelectric film 22 is for vibrating the vibrator 7 with a voltage to be applied from the driving electrode 23. Moreover, the piezoelectric film 22 is for generating, when the vibrator 7 undergoes a rotational motion, a voltage corresponding to an angular rate of the rotational motion and for outputting the voltage to the detecting electrodes 24 and 25. The piezoelectric film 22 is made of a PZT (piezoelectric zirconate titanate) film having a thickness of about 1 μm. The piezoelectric film 22 is formed so as to cover an approximately entire upper surface of the lower electrode 21.

The driving electrode 23 is for inputting a driving signal to the piezoelectric film 22 for vibrating the vibrator 7 at a predetermined frequency. The driving electrode 23 is made of an $IrO_2$ (iridium oxide)/Ir (iridium) laminated film having a thickness of about 200 nm. In the beam part 11, the driving electrode 23 has a width of about 3 μm and a length of about 250 μm. The driving electrode 23 is formed on an upper surface of the piezoelectric film 22. The driving electrode 23 is formed so as to extend toward a center portion of the beam part 11 from the −X-side end of the beam part 11. Moreover, the driving electrode 23 is formed approximately throughout the length of the support 12.

The detecting electrodes 24 and 25 are for detecting the voltage, corresponding to the angular rate, outputted from the piezoelectric film 22. Each of the detecting electrodes 24 and 25 is made of an $IrO_2$/Ir laminated film having a thickness of about 200 nm. In the beam part 11, each of the detecting electrodes 24 and 25 has a width of about 1.0 μm and a length of about 125 μm. The detecting electrodes 24 and 25 are formed on the upper surface of the piezoelectric film 22. The detecting electrodes 24 and 25 are formed parallel to each other so as to extend toward the center portion of the beam part 11 from the +X-side end of the beam part 11. Between the detecting electrodes 24 and 25, a space of about 1.0 μm is provided. The detecting electrode 24 is formed so as to extend in a −Y direction from a center portion of the support 13. Meanwhile, the detecting electrode 25 is formed so as to extend in a +Y direction from the center portion of the support 13.

Note that, as shown in FIG. 1, in the center portion of the beam part 11, a predetermined space (for example, about 125 μm) is provided in the X direction between the driving electrode 23 and the detecting electrodes 24 and 25.

The upper protective film 8 is for protecting the vibrator 7. The upper protective film 8 is formed so as to cover upper and side surfaces of the vibrator 7. The upper protective film 8 is made of insulating $SiO_2$ having a thickness of about 0.5 μm to 1.0 μm. By adjusting the thickness of the upper protective film 8, the frequency of the vibrator 7 can be finely regulated.

The controller 3 is for controlling the vibrator 7. The controller 3 includes a driving electrode controller 31, detecting electrode controllers 32 and 33, and a lower electrode controller 34.

The driving electrode controller 31 is for inputting, to the driving electrode 23, a driving signal for vibrating the vibrator 7 at a predetermined frequency.

The detecting electrode controllers 32 and 33 are for receiving a detection signal to be outputted from the piezoelectric film 22 of the vibrator 7 through the detecting electrodes 24 and 25.

The lower electrode controller 34 is for keeping a potential of the lower electrode 21 constant.

Next, operations of the angular rate sensor 1 will be described.

First, in a state where the potential of the lower electrode 21 is kept constant by the lower electrode controller 34, a driving signal is inputted to the driving electrode 23 by the driving electrode controller 31. Accordingly, a voltage corresponding to the driving signal is applied to the piezoelectric film 22 and thus the piezoelectric film 22 stretches. As a result, the vibrator 7 is vibrated in the Z direction at a constant frequency.

When the vibrator 7 vibrating at the constant frequency undergoes a rotational motion, a Coriolis force acts on the piezoelectric film 22. Thus, the piezoelectric film 22 outputs a detection signal corresponding to the Coriolis force. This detection signal is received by the detecting electrode controllers 32 and 33 through the detecting electrodes 24 and 25. Thereafter, the detection signal is operated by the controller 3 to thereby output an angular rate.

Next, a method for manufacturing the angular rate sensor 1, mainly, the vibrator 7 will be described. FIGS. 5 to 10 are explanatory views showing steps of manufacturing the vibrator.

Figure 5:
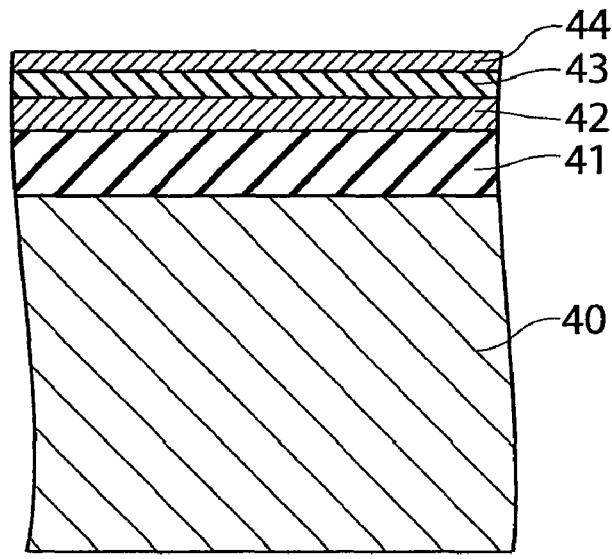
FIG. 5 is an explanatory view showing a step of manufacturing a vibrator.

First, as shown in FIG. 5, an SiO$_2$ film 41 to form the lower protective film 6 is formed on the entire surface of a semiconductor substrate 40 by a CVD (chemical vapor deposition) method or the like. Next, a Pt film 42 to form the lower electrode 21 is formed by a sputtering method. Thereafter, a PZT film 43 to form the piezoelectric film 22 is formed on the Pt film 42 by a sol-gel process. Furthermore, an IrO$_2$/Ir film 44 to form the driving electrode 23 and the detecting electrodes 24 and 25 is formed on the PZT film 43 by the sputtering method.

Figure 6:
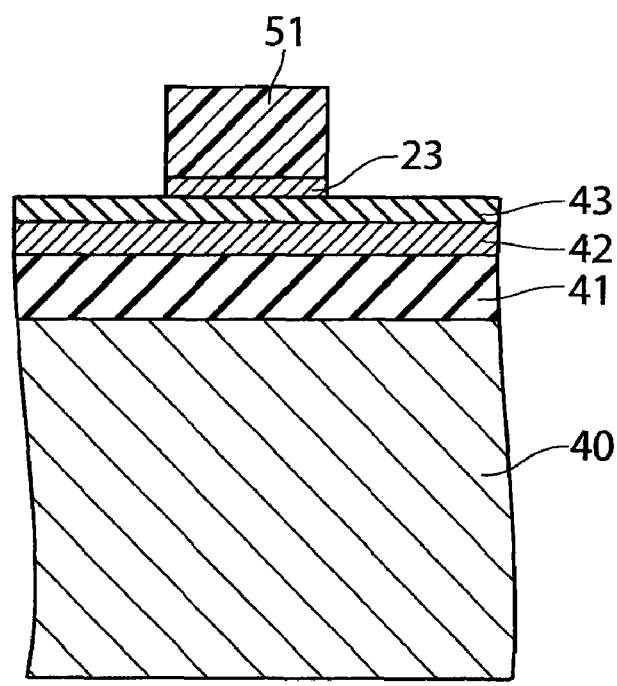
FIG. 6 is an explanatory view showing a step of manufacturing the vibrator.

Next, as shown in FIG. 6, after a resist film 51 is formed, the IrO$_2$/Ir film 44 is patterned by dry etching using halogen-based gas such as Cl$_2$ gas and Ar gas so as to form the driving electrode 23 and the detecting electrodes 24 and 25 (see FIGS. 1 and 4). Thereafter, the resist film 51 is removed.

Figure 7:
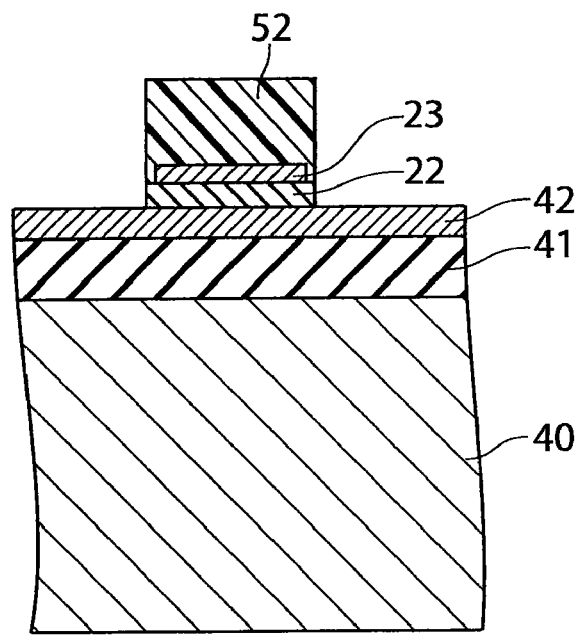
FIG. 7 is an explanatory view showing a step of manufacturing the vibrator.

Subsequently, as shown in FIG. 7, after a resist film 52 is formed, the PZT film 43 is patterned by dry etching using fluorine-based gas and Ar gas so as to form the piezoelectric film 22. Thereafter, the resist film 52 is removed.

Figure 8:
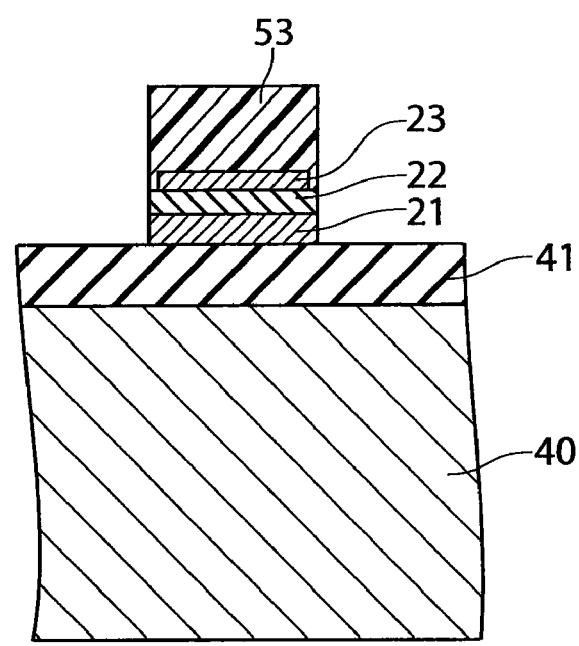
FIG. 8 is an explanatory view showing a step of manufacturing the vibrator.

Next, as shown in FIG. 8, after a resist film 53 is formed, the Pt film 42 is patterned by dry etching using halogen-based gas such as Cl$_2$ gas and Ar gas so as to form the lower electrode 21. Thereafter, the resist film 53 is removed.

Figure 9:
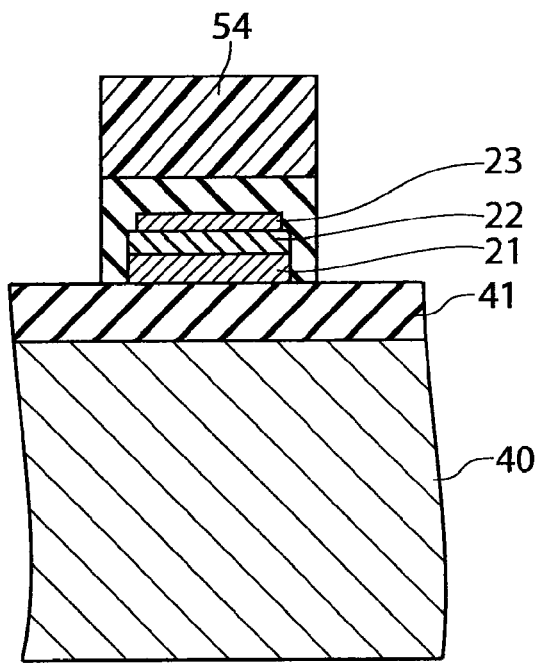
FIG. 9 is an explanatory view showing a step of manufacturing the vibrator.

Next, an SiO$_2$ film (not shown) to form the upper protective film 8 is formed by the CVD method. Thereafter, as shown in FIG. 9, a resist film 54 is formed by photolithography. Subsequently, the SiO$_2$ film is patterned by dry etching using fluorine-based gas such as SF$_6$ so as to form the upper protective film 8. Note that, in the upper protective film 8, through-holes (not shown) are formed on ends of the electrodes 23 to 25. Thereafter, the resist film 54 is removed.

Figure 10:
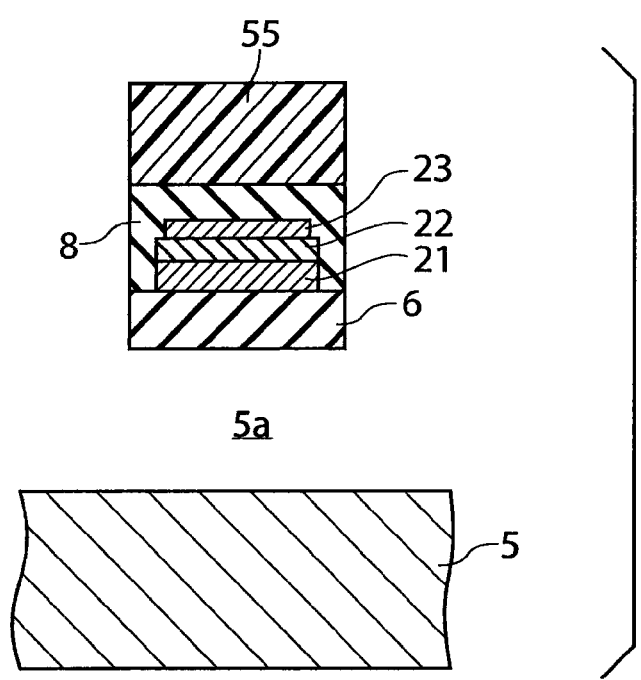
FIG. 10 is an explanatory view showing a step of manufacturing the vibrator.

Next, as shown in FIG. 10, a resist film 55 is formed by photolithography. Thereafter, the SiO$_2$ film 41 is patterned by dry etching using fluorine-based gas such as SF$_6$ so as to form the lower protective film 6. Subsequently, the concave part 5a is formed below the beam part 11 of the vibrator 7 by isotropically dry-etching a part of the semiconductor substrate 40 with fluorine-based gas such as SF$_6$. Thereafter, the resist film 55 is removed. Thus, the element unit 2 is completed.

Next, the controller 3 separately manufactured and the element unit 2 are connected to each other through an Al wiring 35. Thus, the angular rate sensor 1 is completed.

As described above, the angular rate sensor 1 according to the first embodiment includes the vibrator 7 formed so as to have the beam part 11 supported at its both ends and to have the driving electrode 23 and the detecting electrodes 24 and 25 which are extending from the both ends of the beam part 11, respectively. Specifically, the beam part 11 is supported in a state where a space between the driving electrode 23 and the detecting electrodes 24 and 25 floats. Thus, vibration of the vibrator 7 in response to the driving signal inputted to the driving electrode 23 is easily transmitted to the part of the beam part 11 where the detecting electrodes 24 and 25 are formed. As a result, the part of the beam part 11 where the detecting electrodes 24 and 25 are formed can be largely vibrated. Accordingly, detection signals to be detected by the detecting electrodes 24 and 25 are increased in magnitude. Thus, the ability to detect the angular rate can be improved.

Moreover, in the angular rate sensor 1, the driving electrode 23 and the detecting electrodes 24 and 25 are formed with the predetermined space interposed therebetween in the X direction. Here, the length (X direction) of the beam part 11 is much larger than the width (Y direction) thereof. Thus, compared with the case where the driving electrode and the detecting electrodes are formed parallel to each other in the width direction, the space between the driving electrode 23 and the detecting electrodes 24 and 25 can be increased. Thus, a parasitic capacitance to be formed between the driving electrode 23 and the detecting electrodes 24 and 25 can be reduced. Moreover, accordingly, the beam part 11 of the vibrator 7 can be narrowed. Thus, miniaturization of the element unit 2 can be realized.

Second Embodiment

Figure 11:
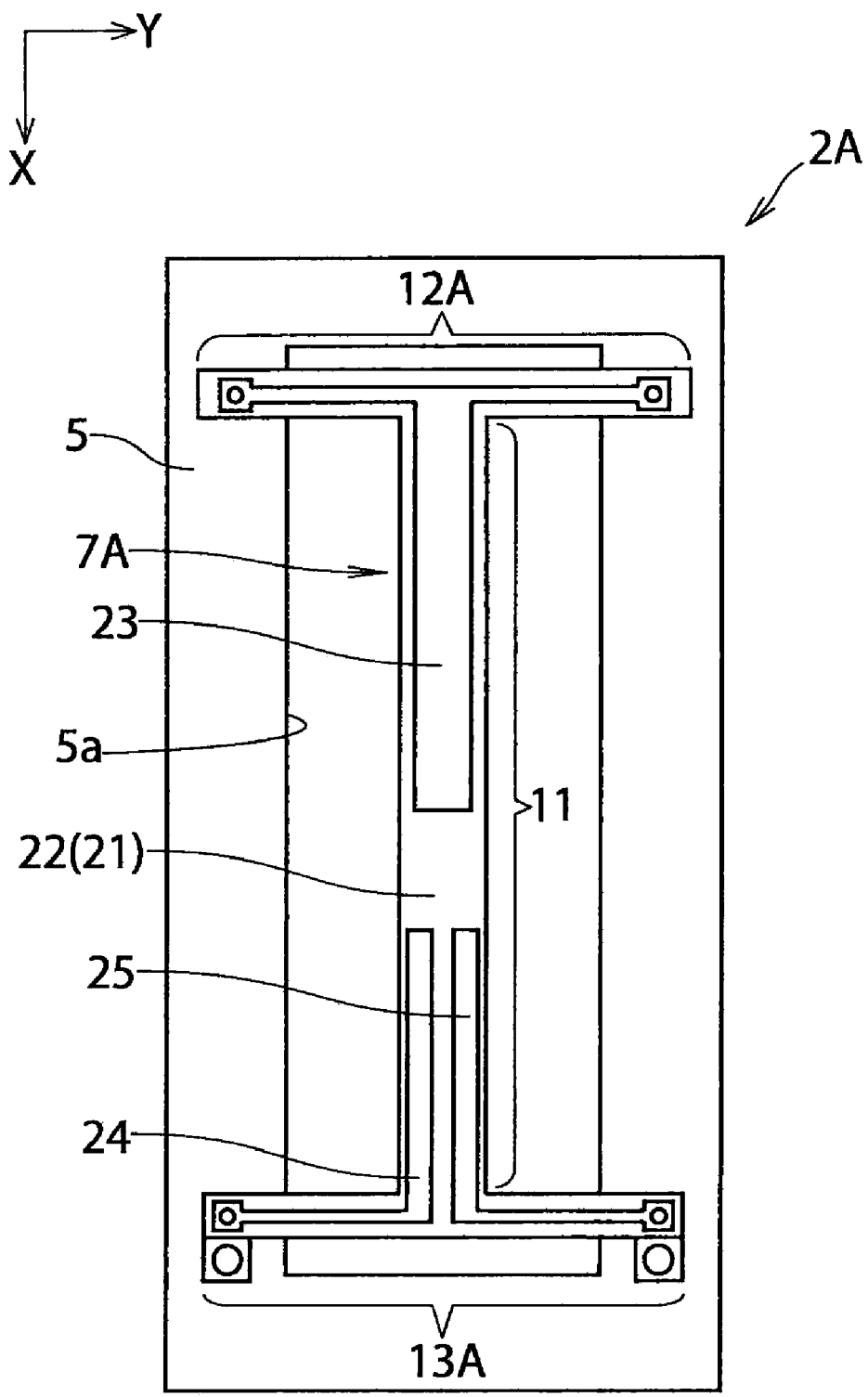
FIG. 11 is a plan view of an element unit according to a second embodiment.
Figure 12:
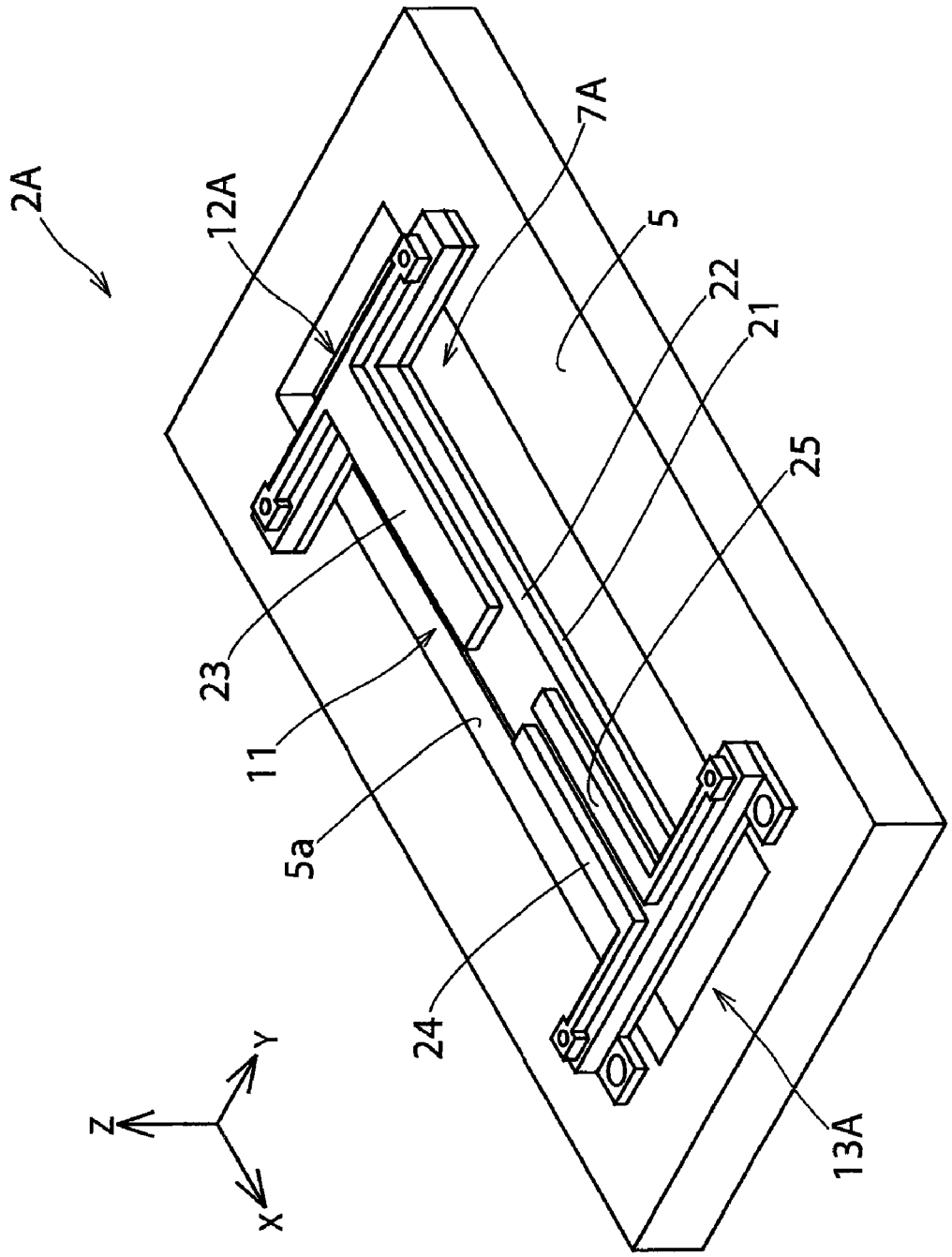
FIG. 12 is a perspective view of the element unit.

Next, with reference to the drawings, description will be given of a second embodiment in which the vibrator according to the first embodiment is partially modified. FIG. 11 is a plan view of an element unit according to the second embodiment. FIG. 12 is a perspective view of the element unit. Note that the same components as those of the first embodiment are denoted by the same reference numerals and description thereof will be omitted.

As shown in FIGS. 11 and 12, an element unit 2A includes a semiconductor substrate 5 and a vibrator 7A. Note that the element unit 2A has a lower protective film and an upper protective film for protecting the vibrator 7A, as in the case of the first embodiment. However, those protective films are omitted in FIGS. 11 and 12.

The vibrator 7A includes a beam part 11 and a pair of supports 12A and 13A.

Both ends of the supports 12A and 13A are formed on the semiconductor substrate 5. Meanwhile, center portions of the supports 12A and 13A are formed above a concave part 5a of the semiconductor substrate 5. Specifically, the center portions of the supports 12A and 13A are supported in a state of floating from the semiconductor substrate 5.

As described above, in the vibrator 7A according to the second embodiment, the center portions of the supports 12A and 13A are supported in the state of floating from the semiconductor substrate 5. Thus, when the vibrator 7A is vibrated in response to a driving signal inputted to a driving electrode 23, not only the beam part 11 but also the center portions of the supports 12A and 13A vibrate. As a result, the beam part 11 can be more largely vibrated. Thus, the detection ability can be improved.

Third Embodiment

Figure 13:
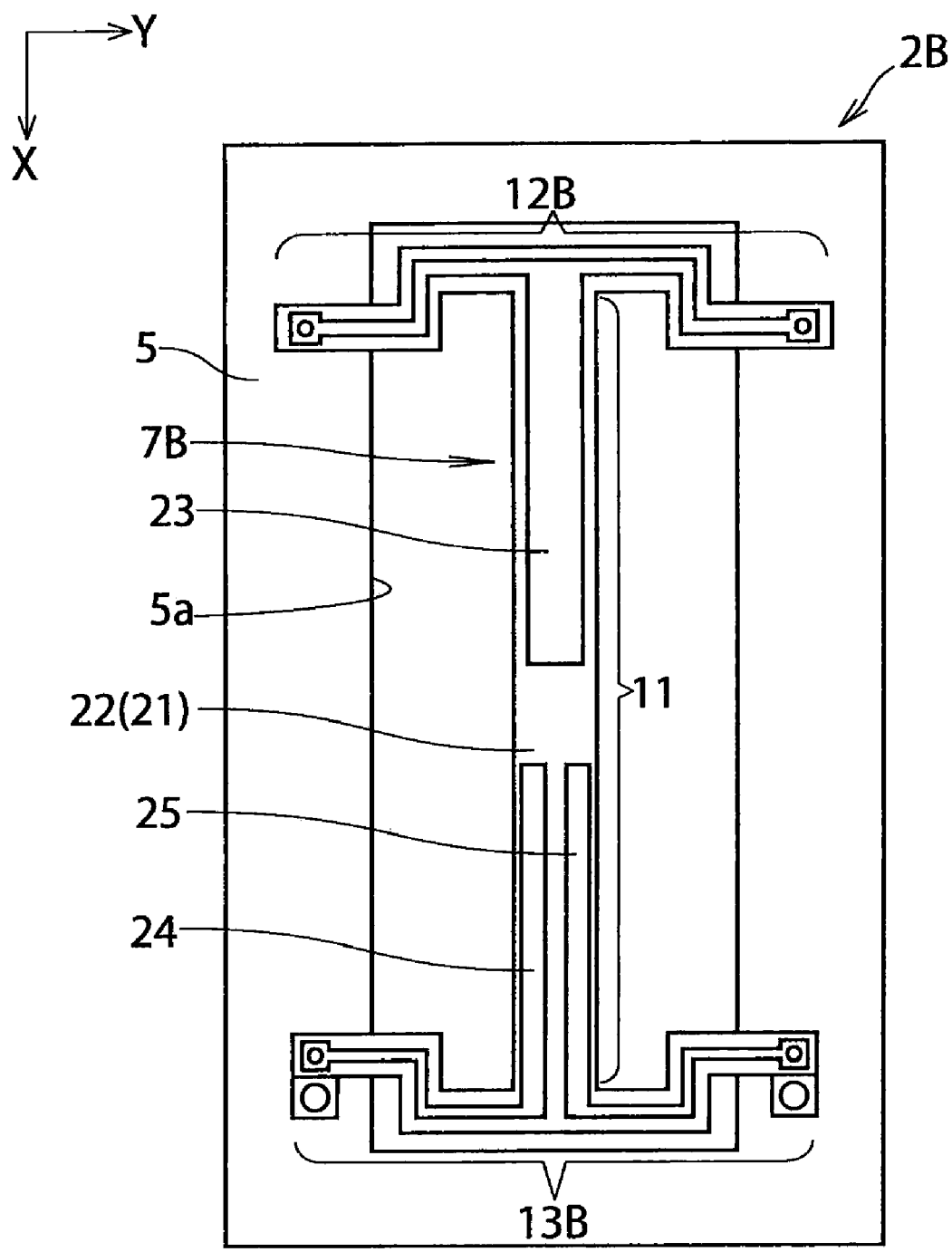
FIG. 13 is a plan view of an element unit according to a third embodiment.
Figure 14:
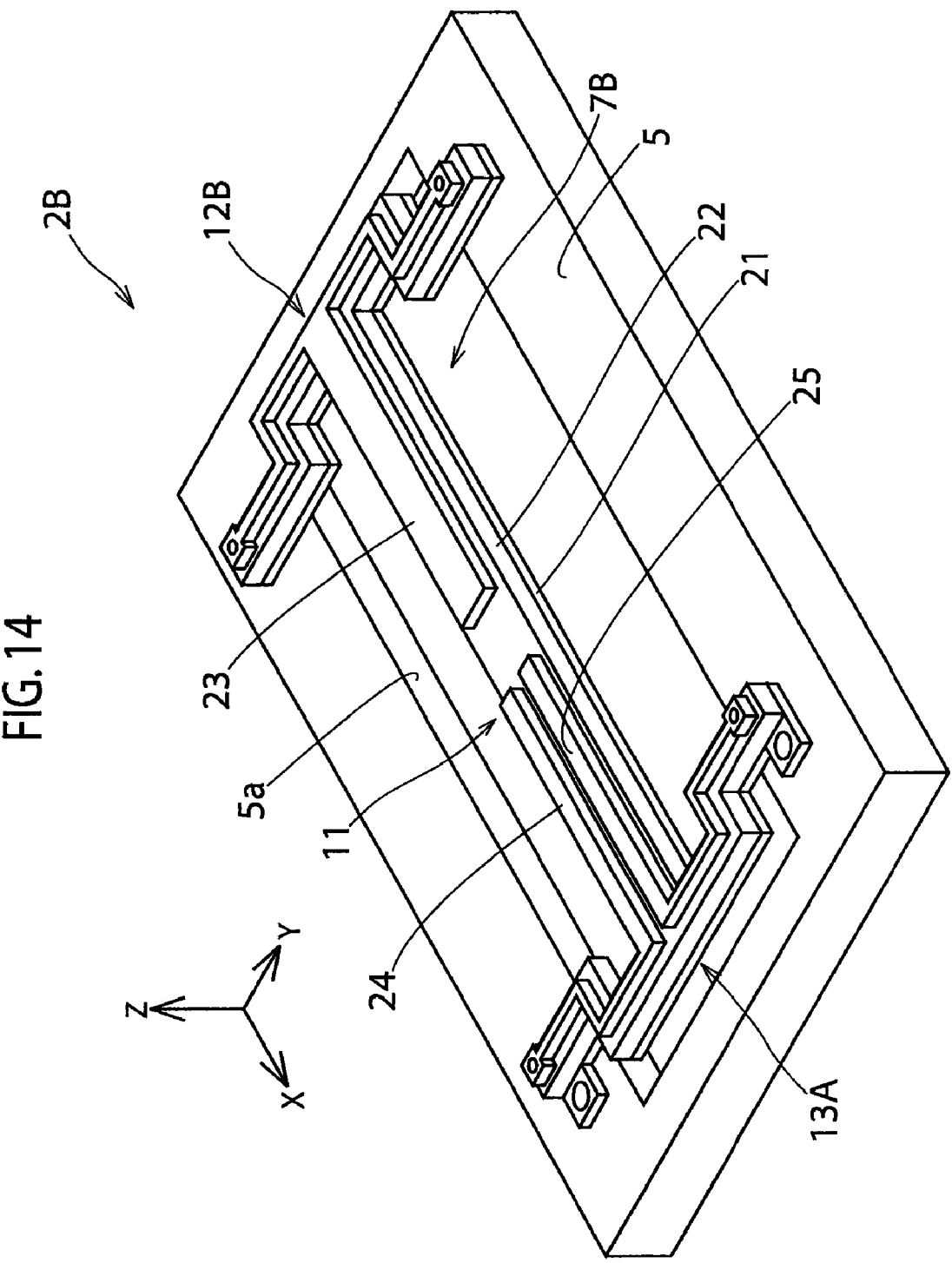
FIG. 14 is a perspective view of the element unit.

Next, with reference to the drawings, description will be given of a third embodiment in which the vibrator according to the second embodiment is partially modified. FIG. 13 is a plan view of an element unit according to the third embodiment. FIG. 14 is a perspective view of the element unit. Note that the same components as those of the above embodiments are denoted by the same reference numerals and description thereof will be omitted.

As shown in FIGS. 13 and 14, an element unit 2B includes a semiconductor substrate 5 and a vibrator 7B. Note that the element unit 2B has a lower protective film and an upper protective film for protecting the vibrator 7B, as in the case of the first embodiment. However, those protective films are omitted in FIGS. 13 and 14.

The vibrator 7B includes a beam part 11 and a pair of supports 12B and 13B.

Both ends of the supports 12B and 13B are formed on the semiconductor substrate 5. Meanwhile, center portions of the supports 12B and 13B are formed above a concave part 5a of the semiconductor substrate 5. Specifically, the center portions of the supports 12B and 13B are supported in a state of floating from the semiconductor substrate 5.

In the plan view, the supports 12B and 13B are bent. To be more specific, both ends of the supports 12B and 13B in a Y direction are formed so as to extend in the Y direction. Meanwhile, center portions of the supports 12B and 13B in the Y direction are formed so as to extend in an X direction. Thus, the supports 12B and 13B are formed in such a manner that a length of a portion thereof floating from the semiconductor substrate 5 is set larger than the length thereof in the second embodiment.

As described above, in the vibrator 7B according to the third embodiment, the floating portions of the supports 12B and 13B are extended by bending the supports 12B and 13B. Thus, when the vibrator 7B is vibrated in response to a driving signal inputted to a driving electrode 23, vibration of the beam part 11 can be further increased.

(Vibration Experiment on Vibrator)

Figure 15:
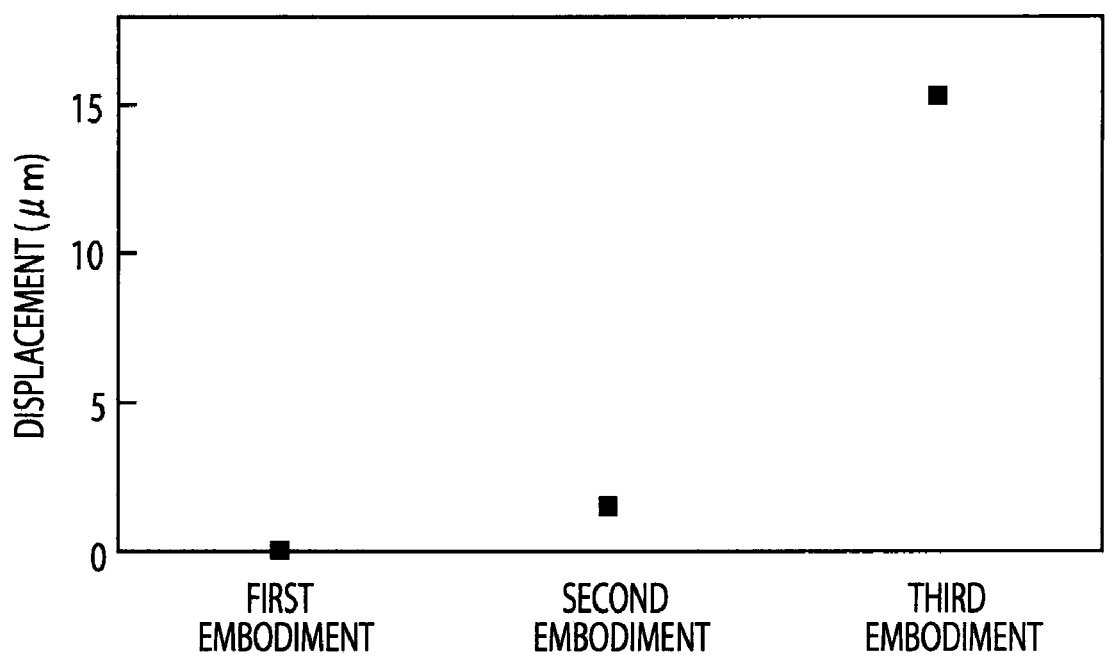
FIG. 15 shows a result of a vibration experiment in each of the embodiments.

Next, description will be given of an experiment of checking vibration of the vibrator by inputting a driving signal to the driving electrode of the vibrator according to each of the first to third embodiments described above. FIG. 15 shows a result of the vibration experiment in each of the embodiments.

As shown in FIG. 15, a displacement of vibration in the first embodiment was 0.034 µm, a displacement of vibration in the second embodiment was 1.5 µm, and a displacement of vibration in the third embodiment was 15.3 µm. Specifically, it turned out that the vibrator according to the third embodiment underwent the largest vibration and that the vibration got smaller in the second embodiment and further smaller in the first embodiment. Particularly, the vibration of the vibrator according to the third embodiment is about 450 times that of the vibrator according to the first embodiment. This shows that the displacement of the vibration can be increased by increasing the length of the portion of the supports floating from the semiconductor substrate.

Fourth Embodiment

Figure 16:
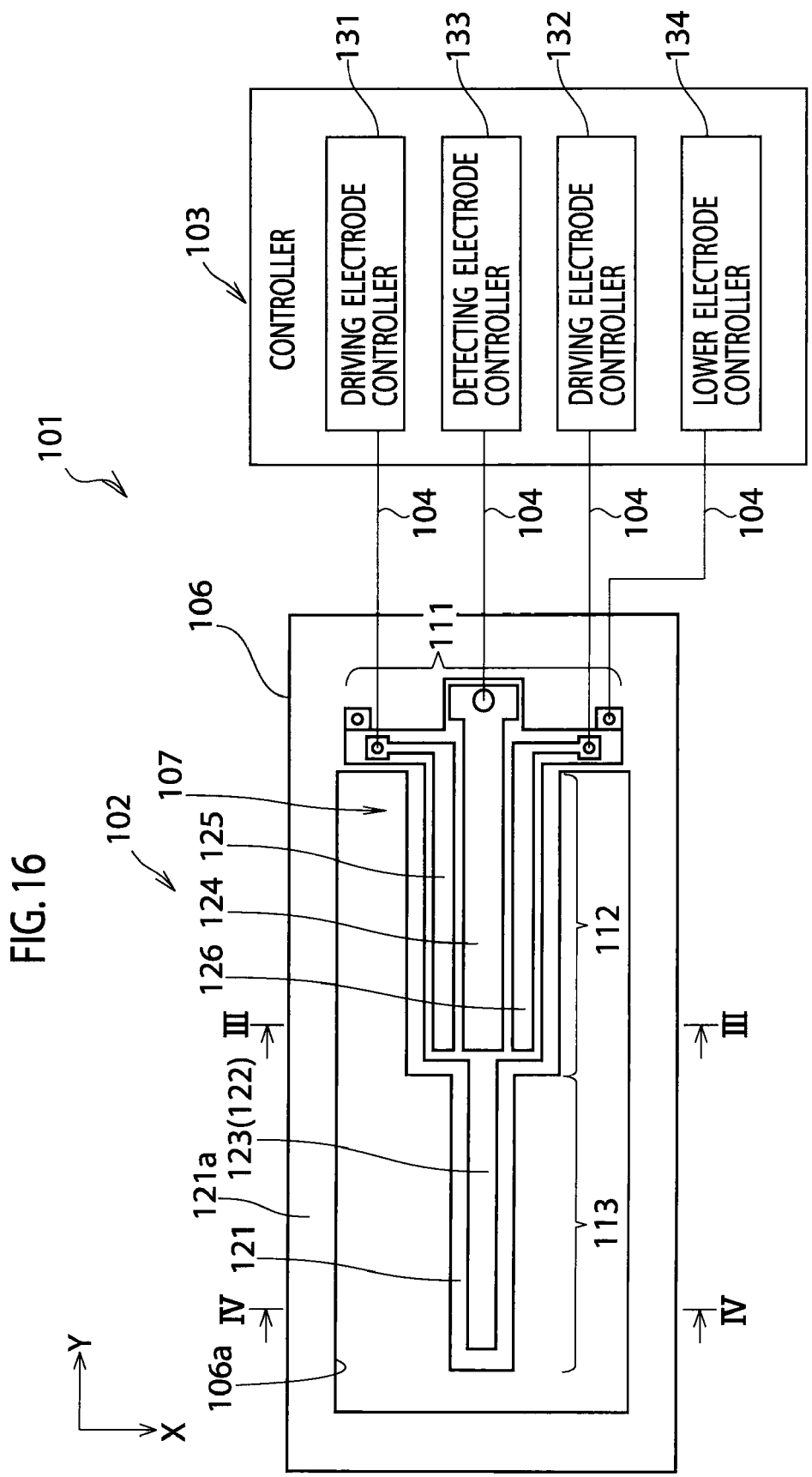
FIG. 16 is an overall configuration diagram of an angular rate sensor according to a fourth embodiment.
Figure 17:
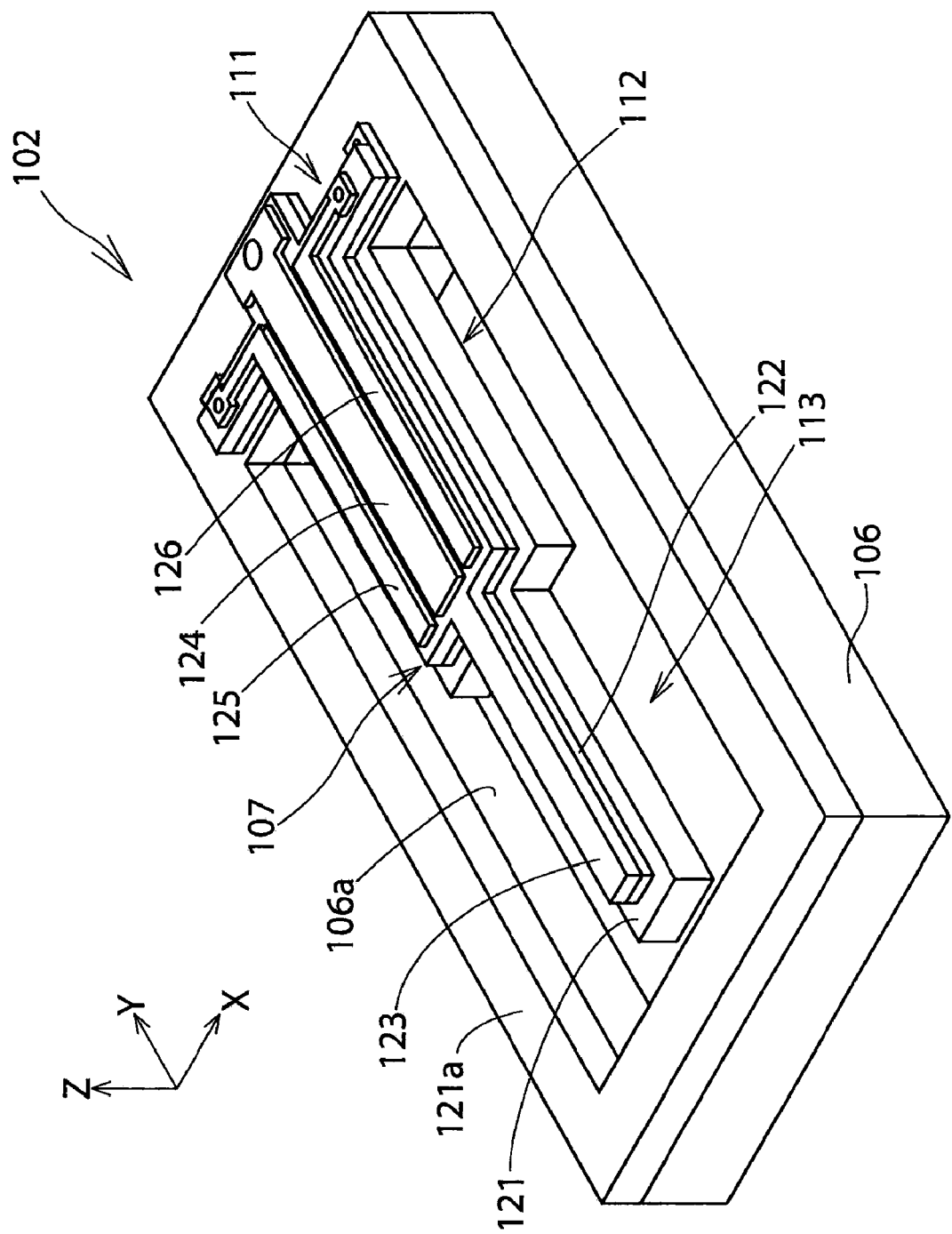
FIG. 17 is a perspective view of an element unit including a vibrator.
Figure 18:
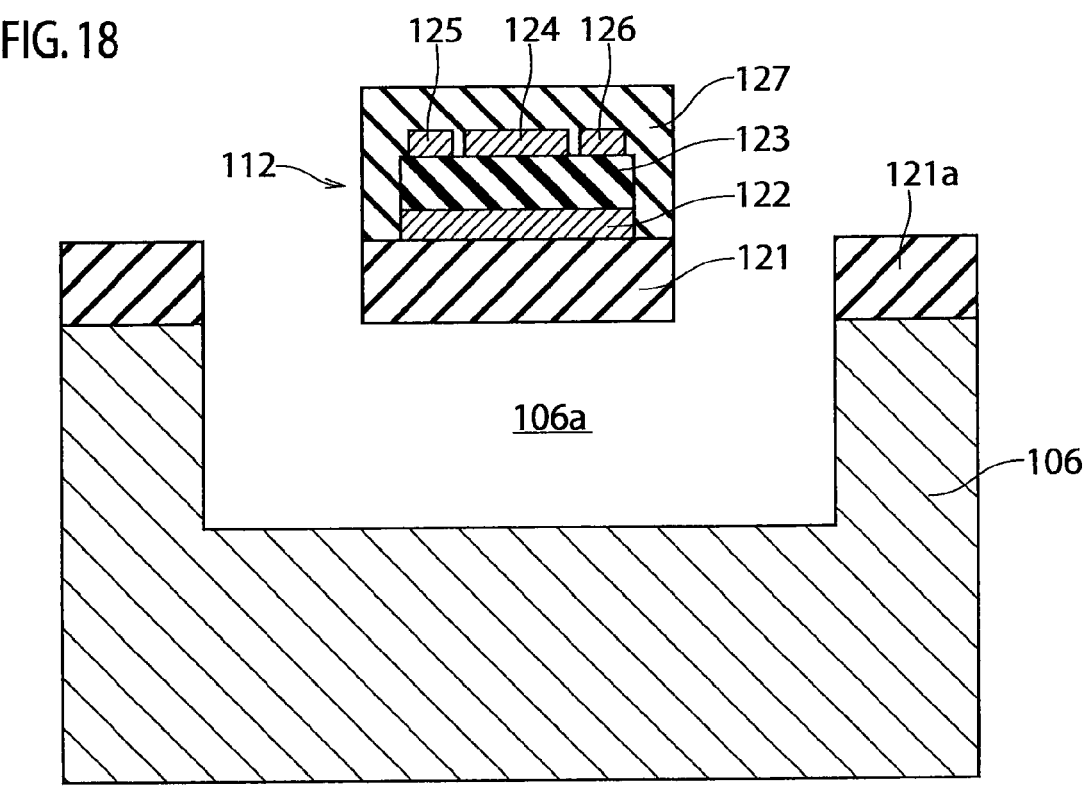
FIG. 18 is a cross-sectional view taken along the line III-III in FIG. 16.
Figure 19:
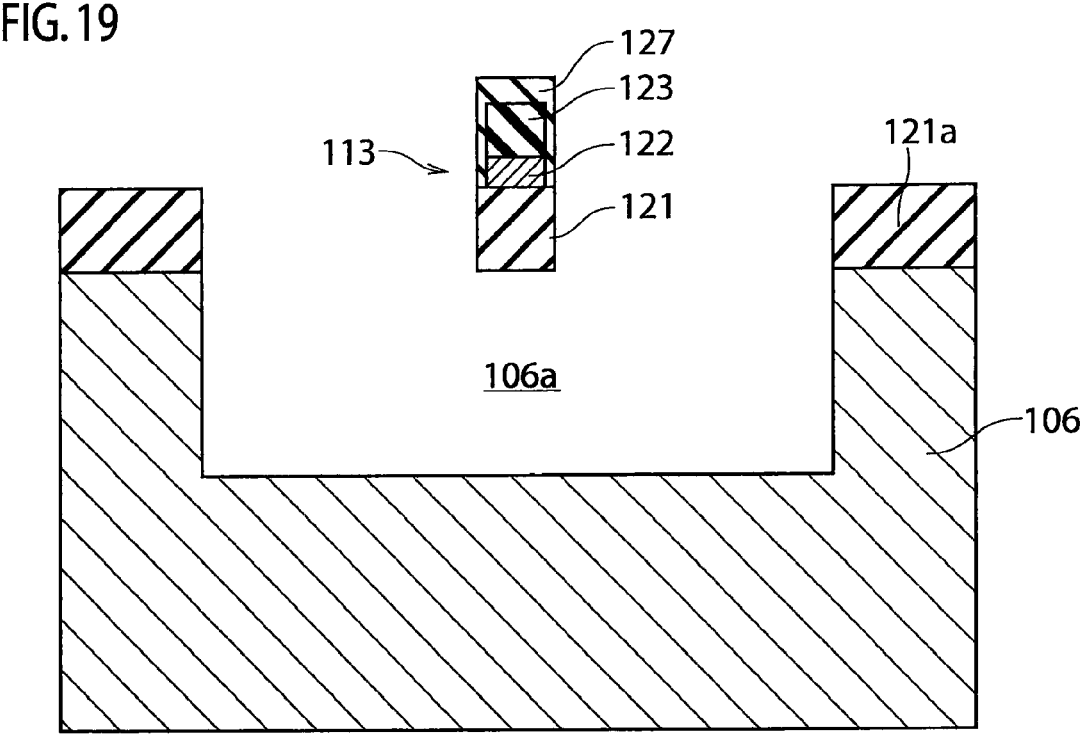
FIG. 19 is a cross-sectional view taken along the line IV-IV in FIG. 16.

With reference to the drawings, a fourth embodiment of the present invention will be described below. FIG. 16 is an overall configuration diagram of an angular rate sensor according to the fourth embodiment. FIG. 17 is a perspective view of an element unit including a vibrator. FIG. 18 is a cross-sectional view taken along the line III-III in FIG. 16. FIG. 19 is a cross-sectional view taken along the line IV-IV in FIG. 16. X, Y and Z shown in FIGS. 16 and 17 are X, Y and Z directions, respectively. Moreover, the X direction is a width direction, the Y direction is a length direction and the Z direction is a thickness direction.

As shown in FIG. 16, an angular rate sensor 101 according to the fourth embodiment includes an element unit 102, a controller 103 and Al wirings 104 for connecting the element unit 102 and the controller 103 to each other.

As shown in FIGS. 16 and 17, the element unit 102 includes a semiconductor substrate 106 and a vibrator 107.

The semiconductor substrate 106 is made of silicon having a thickness of about 300 µm. The thickness of the semiconductor substrate 106 can be accordingly changed as long as the thickness allows the substrate to be held in mounting thereof or the like. In a part of the semiconductor substrate 106, a concave part 106a is formed, which has a depth of 50 µm or more (preferably 100 µm or more). Note that the depth of the concave part 106a is not limited to 50 µm or more as long as the depth is not affected by changes of pressure when a detector 112 and a resonance frequency regulator 113 of the vibrator 107 to be described later vibrate.

The vibrator 107 is formed to have a cantilever shape extending from the semiconductor substrate 106. The vibrator 107 includes a support 111, the detector 112 and the resonance frequency regulator 113.

The support 111 is for supporting the detector 112 and the resonance frequency regulator 113. The support 111 is formed on the semiconductor substrate 106. The support 111 is formed integrally at an end of the detector 112 in a +Y-direction. The support 111 is formed so as to extend in the X direction crossing the detector 112.

The detector 112 is for detecting an angular rate. The detector 112 is formed into a linear shape extending in the Y direction from the semiconductor substrate 106. The detector 112 has a width of about 22 µm, a length of about 200 to 300 µm and a thickness of about 9 to 13 µm. Specifically, the detector 112 is formed so as to have the width larger than the thickness. Moreover, the width of the detector 112 is set larger than that of the resonance frequency regulator 113. Note that the shape of the detector 112 is just an example. The concave part 106a allows the detector 112 to be supported in a state of floating from the semiconductor substrate 106. Thus, the detector 112 can vibrate in the X and Z directions.

The resonance frequency regulator 113 is for regulating a resonance frequency of the vibrator 107. To be more specific, the resonance frequency regulator 113 is for regulating a ratio of a resonance frequency of the vibrator 107 in the X direction to a resonance frequency thereof in the Z direction. The resonance frequency regulator 113 is formed into a linear shape extending in the Y direction from a front end (an end in a −Y-direction) of the detector 112. Moreover, the resonance frequency regulator 113 is provided in a center portion in the width direction of the front end of the detector 112. The resonance frequency regulator 113 has a width of about 5 µm, a length of about 200 to 300 µm and a thickness of about 9 to 13 µm. Specifically, the resonance frequency regulator 113 is formed so as to have the width smaller than the thickness. Note that the shape of the resonance frequency regulator 113 described above is just an example. By changing the width, length and thickness, the ratio of resonance frequencies of the detector 112 in the X and Z directions can be regulated. The concave part 106a allows the resonance frequency regulator 113 to be supported in a state of floating from the semiconductor substrate 106. Thus, the resonance frequency regulator 113 can vibrate, together with the detector 112, in the X and Z directions.

Next, with reference to FIGS. 18 and 19, a layer structure of the vibrator 107 will be described.

As shown in FIGS. 18 and 19, the vibrator 107 includes a lower protective film 121, a lower electrode 122, a piezoelectric film 123, a detecting electrode 124, a pair of driving electrodes 125 and 126, and an upper protective film 127. Note that the upper protective film 127 is omitted in FIGS. 16 and 17.

The lower protective film 121 is for protecting a lower part of the vibrator 107 and for regulating a resonance frequency of the vibrator 107. Regulation of the resonance frequency mentioned here means simultaneous regulation of resonance frequencies of the detector 112 in the X and Z directions by changing a thickness of the lower protective film 121. The lower protective film 121 is made of insulating $SiO_2$ having a thickness of several µm or more. The lower protective film 121 is formed so as to cover a lower surface of the lower electrode 122. Moreover, a lower protective film 121a is formed so as to cover an approximately entire area of an upper surface of the semiconductor substrate 106 except for the concave part 106a.

The lower electrode 122 is for maintaining a lower surface of the piezoelectric film 123 at a predetermined potential. The lower electrode 122 is made of Pt (platinum) having a thickness of about 200 nm. The lower electrode 122 is formed on the lower protective film 121 so as to cover the lower surface of the piezoelectric film 123. In both end portions of the support 111 in the X direction, a part of the lower electrode 122 is formed so as to be exposed from the piezoelectric film 123. The lower electrode 122 is connected to the controller 103 through the exposed portion.

The piezoelectric film 123 is for vibrating the vibrator 107 with a voltage (a driving signal) to be applied from the driving electrodes 125 and 126. Moreover, the piezoelectric film 123 is for outputting to the detecting electrode 124, when the vibrator 107 undergoes a rotational motion, a detection signal corresponding to an angular rate of the rotational motion. The piezoelectric film 123 is made of PZT (piezoelectric zirconate titanate) having a thickness of about 1 μm. The piezoelectric film 123 is formed so as to cover an upper surface of the lower electrode 122 except for the connection portion.

The detecting electrode 124 is for detecting the detection signal corresponding to the angular rate outputted from the piezoelectric film 123. The detecting electrode 124 is made of an $IrO_2$ (iridium oxide)/Ir (iridium) laminated film having a thickness of about 200 nm. The detecting electrode 124 is formed in a center portion in the X direction on an upper surface of the piezoelectric film 123 in the detector 112. In the Y direction, the detecting electrode 124 is formed approximately throughout the length of the detector 112.

The driving electrodes 125 and 126 are for inputting a driving signal to the piezoelectric film 123 for vibrating the vibrator 107 at a predetermined resonance frequency in the X direction. The driving electrodes 125 and 126 are made of an $IrO_2$/Ir laminated film having a thickness of about 200 nm. The driving electrodes 125 and 126 are formed on the upper surface of the piezoelectric film 123 in the detector 112. The driving electrodes 125 and 126 are formed parallel to each other at positions symmetric about the detecting electrode 124. In the Y direction, the driving electrodes 125 and 126 are formed approximately throughout the length of the detector 112. Between the driving electrode 125 (126) and the detecting electrode 124, a predetermined space is provided for reducing generation of a parasitic capacitance. Moreover, one end of the driving electrode 125 is formed so as to extend in a −X direction from a center portion of the support 111. Meanwhile, one end of the driving electrode 126 is formed so as to extend in a +X direction from the center portion of the support 111.

The upper protective film 127 is for protecting the vibrator 107. The upper protective film 127 is formed so as to cover upper and side surfaces of the vibrator 107. The upper protective film 127 is made of insulating $SiO_2$ having a thickness of about 0.5 to 1.0 μm. By adjusting the thickness of the upper protective film 127, the frequency of the detector 112 can be finely regulated.

The controller 103 is for controlling the vibrator 107 in the element unit 102. The controller 103 includes driving electrode controllers 131 and 132, a detecting electrode controller 133 and a lower electrode controller 134.

The driving electrode controllers 131 and 132 are for inputting, to the driving electrodes 125 and 126, a driving signal for vibrating the detector 112 in the vibrator 107 in the X direction at a predetermined resonance frequency.

The detecting electrode controller 133 is for receiving a detection signal to be outputted from the piezoelectric film 123 of the vibrator 107 through the detecting electrode 124.

The lower electrode controller 134 is for keeping a potential of the lower electrode 122 constant.

Next, operations of the angular rate sensor 101 will be described.

First, in a state where the potential of the lower electrode 122 is kept constant by the lower electrode controller 134, a driving signal is inputted to the driving electrodes 125 and 126 by the driving electrode controllers 131 and 132. Accordingly, a voltage corresponding to the driving signal is applied to the piezoelectric film 123 and thus the piezoelectric film 123 stretches. As a result, the vibrator 107 is vibrated in the X direction at a predetermined resonance frequency.

When the detector 112 vibrated in the X direction at the resonance frequency described above undergoes a rotational motion, a Coriolis force acts on the detector 112 including the piezoelectric film 123. Thus, the detector 112 is vibrated in the Z direction. As a result, the piezoelectric film 123 outputs, to the detecting electrode 124, a detection signal corresponding to an angular rate of the rotational motion. This detection signal is received by the detecting electrode controller 133 through the detecting electrode 124. Thereafter, the detection signal is operated by the controller 103 and an angular rate is thereby outputted.

Next, a method for manufacturing the angular rate sensor 101, mainly, the element unit 102 including the vibrator 107 will be described. FIGS. 20 to 27 are explanatory views showing steps of manufacturing the element unit including the vibrator according to the fourth embodiment.

Figure 20:
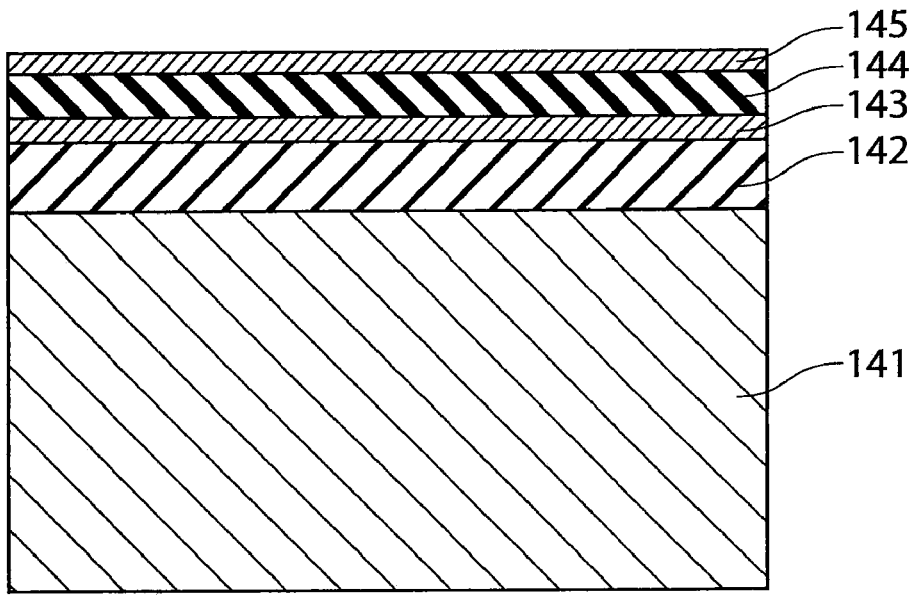
FIG. 20 is an explanatory view showing a step of manufacturing the element unit including the vibrator according to the fourth embodiment.

First, as shown in FIG. 20, an $SiO_2$ film 142 to form the lower protective films 121 and 121a is formed on the entire upper surface of a semiconductor substrate 141 by a CVD (chemical vapor deposition) method. Next, a Pt film 143 to form the lower electrode 122 is formed on the $SiO_2$ film 142 by a sputtering method. Thereafter, a PZT film 144 to form the piezoelectric film 123 is formed on the Pt film 143 by a sol-gel process. Furthermore, an $IrO_2$/Ir film 145 to form the detecting electrode 124 and the driving electrodes 125 and 126 is formed on the PZT film 144 by the sputtering method.

Figure 21:
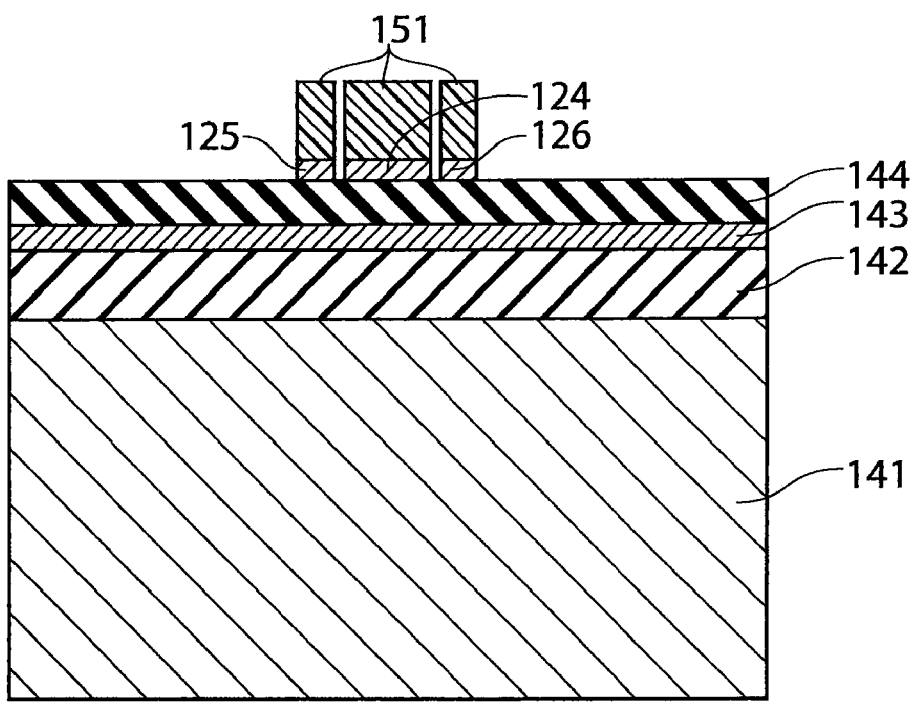
FIG. 21 is an explanatory view showing a step of manufacturing the element unit including the vibrator according to the fourth embodiment.

Next, as shown in FIG. 21, after a resist film 151 is formed by photolithography, the $IrO_2$/Ir film 145 is patterned by dry etching using halogen-based gas such as $Cl_2$ gas and Ar gas to form the detecting electrode 124 and the driving electrodes 125 and 126. Thereafter, the resist film 151 is removed.

Figure 22:
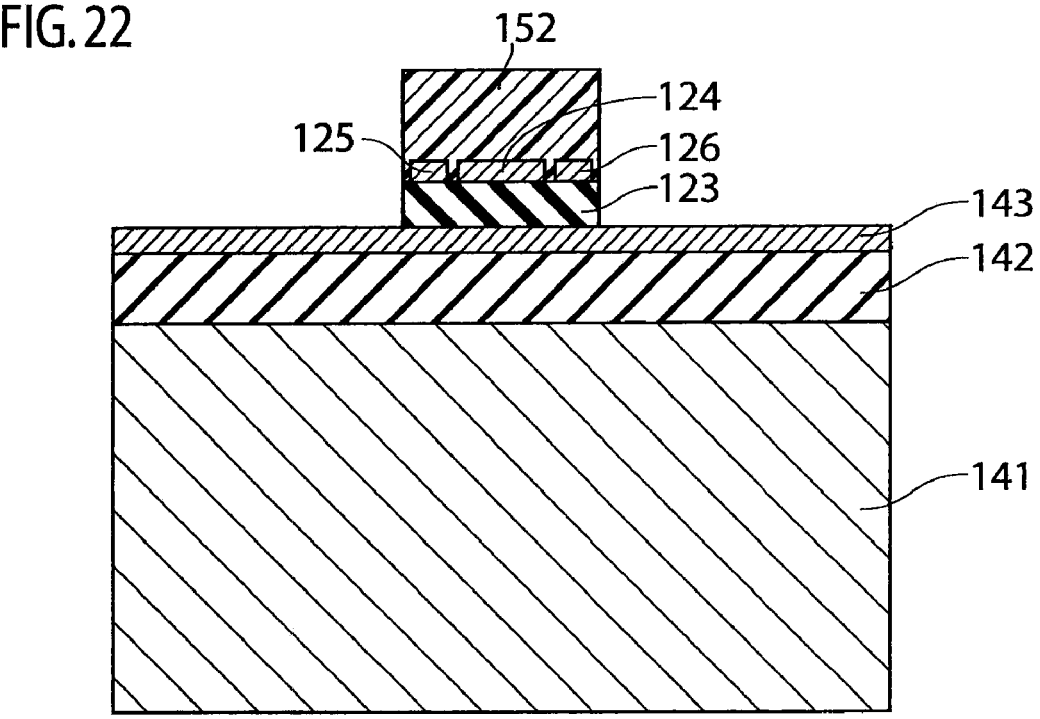
FIG. 22 is an explanatory view showing a step of manufacturing the element unit including the vibrator according to the fourth embodiment.

Subsequently, as shown in FIG. 22, after a resist film 152 is formed by photolithography, the PZT film 144 is patterned by dry etching using fluorine-based gas and Ar gas to form the piezoelectric film 123. Thereafter, the resist film 152 is removed.

Figure 23:
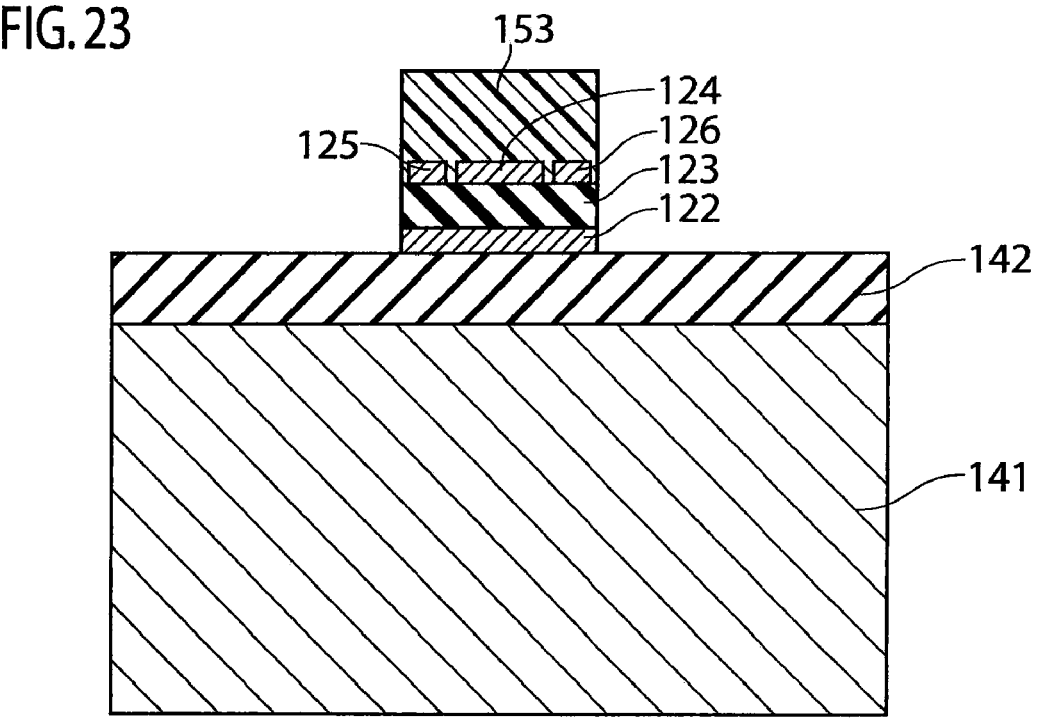
FIG. 23 is an explanatory view showing a step of manufacturing the element unit including the vibrator according to the fourth embodiment.

Next, as shown in FIG. 23, after a resist film 153 is formed by photolithography, the Pt film 143 is patterned by dry etching using halogen-based gas such as $Cl_2$ gas and Ar gas to form the lower electrode 122. Thereafter, the resist film 153 is removed.

Figure 24:
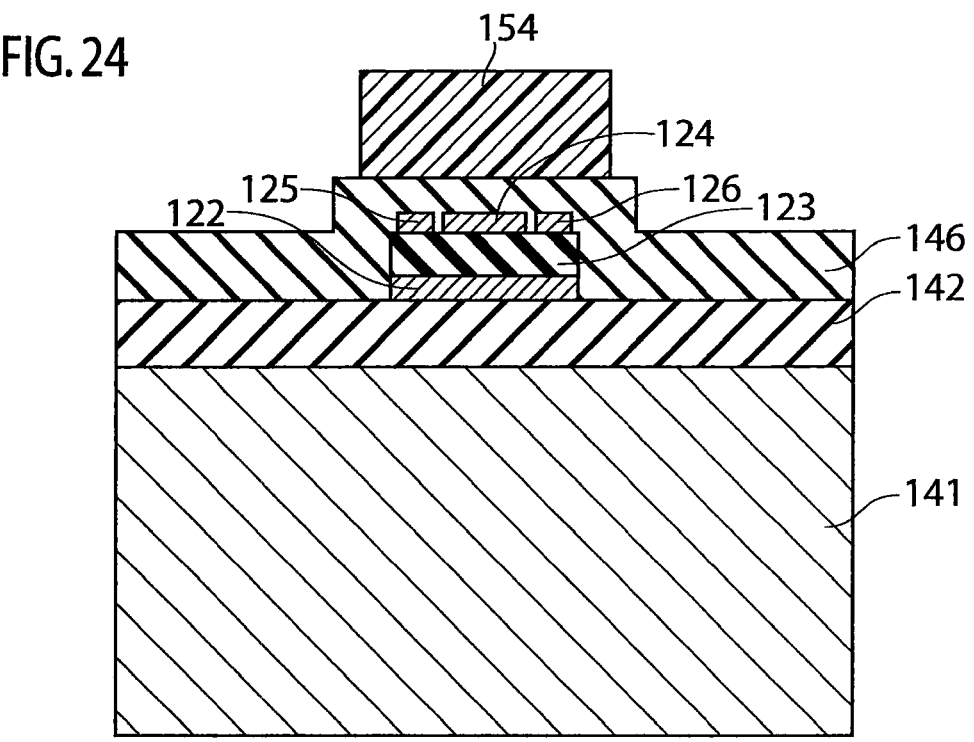
FIG. 24 is an explanatory view showing a step of manufacturing the element unit including the vibrator according to the fourth embodiment.

Next, as shown in FIG. 24, an $SiO_2$ film 146 to form the upper protective film 127 is formed by the CVD method. Thereafter, a resist film 154 is formed by photolithography.

Figure 25:
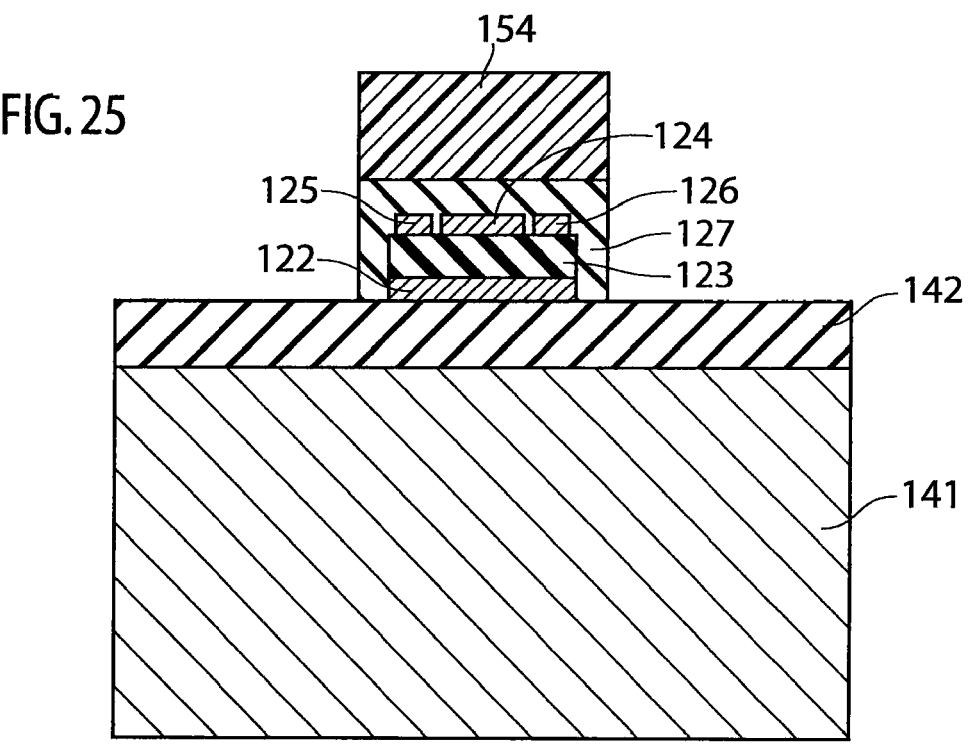
FIG. 25 is an explanatory view showing a step of manufacturing the element unit including the vibrator according to the fourth embodiment.

Subsequently, as shown in FIG. 25, the $SiO_2$ film 146 is patterned by dry etching using fluorine-based gas such as $SF_6$ to form contact holes (not shown) in the $SiO_2$ film 146. Thereafter, the resist film 154 is removed. Subsequently, after the Al wirings 104 to be connected to the contact holes are formed, an $SiO_2$ film is further formed thereon. Thus, the upper protective film 127 is formed.

Figure 26:
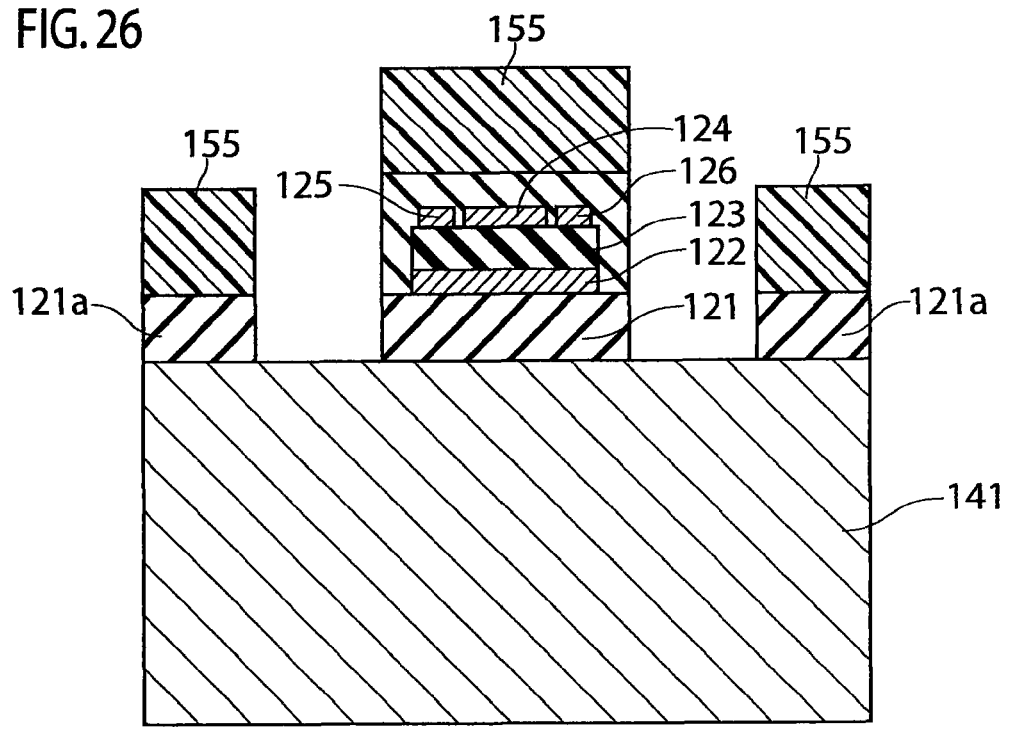
FIG. 26 is an explanatory view showing a step of manufacturing the element unit including the vibrator according to the fourth embodiment.

Next, as shown in FIG. 26, a resist film 155 is formed by photolithography. Thereafter, the $SiO_2$ film 142 is patterned by dry etching using fluorine-based gas such as $SF_6$ to form the lower protective films 121 and 121a.

Figure 27:
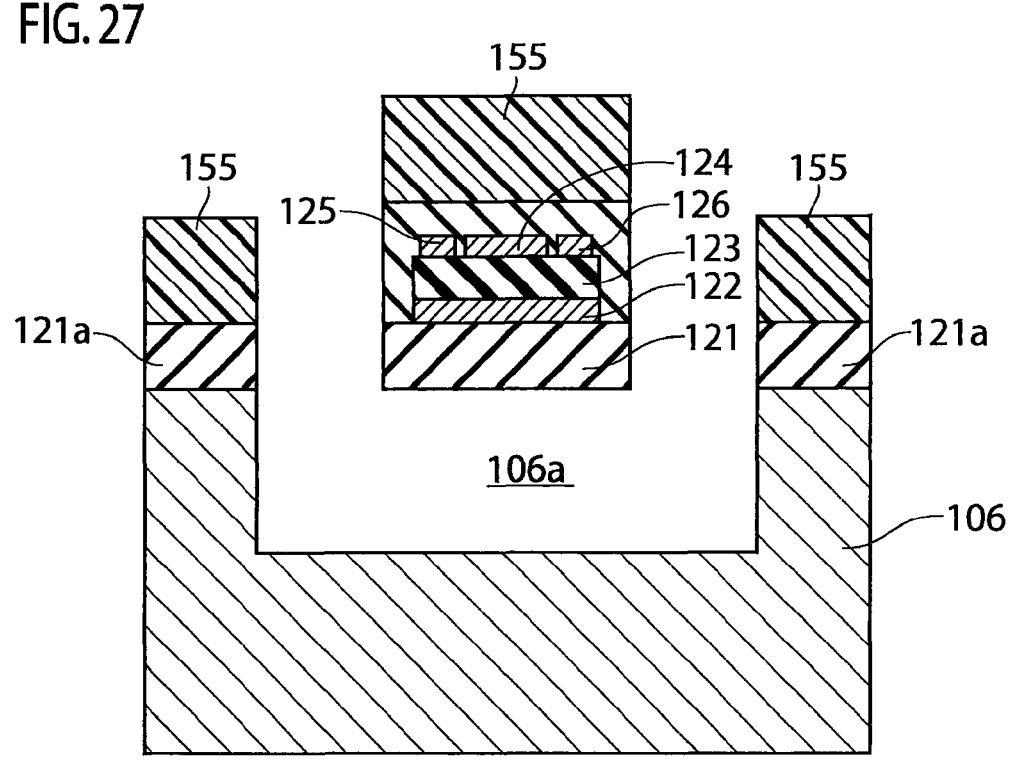
FIG. 27 is an explanatory view showing a step of manufacturing the element unit including the vibrator according to the fourth embodiment.

Next, as shown in FIG. 27, the concave part 106a is formed below the detector 112 and the resonance frequency regulator 113 of the vibrator 107 by isotropically dry-etching a part of the semiconductor substrate 141 with fluorine-based gas such as $SF_6$. Thereafter, the resist film 155 is removed. Thus, the element unit 102 is completed.

Next, the controller 103 separately manufactured and the element unit 102 are connected to each other. Thus, the angular rate sensor 101 is completed.

As described above, the angular rate sensor 101 according to the fourth embodiment includes the vibrator 107 having the resonance frequency regulator 113 capable of regulating the ratio of resonance frequencies in the X and Z directions. Accordingly, the ratio of resonance frequencies of the vibrator 107 is optimized by the shape of the resonance frequency regulator 113. Thus, the detection signal to be outputted to the detecting electrode 124 from the piezoelectric film 123 can be increased in magnitude. As a result, the ability of the angular rate sensor 101 to detect the angular rate can be easily improved.

In other words, the output of the detection signal can be increased by the shape of the resonance frequency regulator 113 without setting the width and thickness of the detector 112 to be equal to each other. Thus, since only the width of the detector 112 can be increased, the width of the detecting electrode 124 formed in the detector 112 and the width of the piezoelectric film 123 can be increased. Therefore, the detection signal can be further increased in magnitude. As a result, the thickness of the detector 112 can be reduced. Thus, miniaturization of the element unit 102 and reduction in the thickness of the film can be realized.

Moreover, in the angular rate sensor 101, the width of the detector 112 having the detecting electrode 124 formed therein is set larger than the width of the resonance frequency regulator 113. Thus, the ability to detect the angular rate can be improved.

Moreover, in the angular rate sensor 101, the resonance frequency regulator 113 is provided in the center portion in the X direction of the front end of the detector 112. Thus, regulation of the ratio of resonance frequencies can be simplified.

Moreover, the resonance frequency regulator 113 of the angular rate sensor 101 can be simultaneously formed in patterning of the detector 112. In other words, the resonance frequency regulator 113 can be formed by changing patterns of the resist films 151 to 155 without increasing the number of manufacturing steps. As a result, the effects described above can be achieved without complicating the manufacturing steps.

Performance and Effects of Fourth Embodiment

Next, description will be given of a simulation and an experiment conducted to check performance and effects of the fourth embodiment described above.

(Relationship Between Ratio of Resonance Frequencies and Displacement)

First, description will be given of a relationship between a ratio R of resonance frequencies of the detector and a displacement $X(t)$ in the X direction. The ratio R of resonance frequencies here means (resonance frequency $\omega_Z$ in the Z direction)/(resonance frequency $\omega_X$ in the X direction). The displacement $X(t)$ in the X direction can be expressed as in the equation (1) by using the resonance frequency $\omega_X$ in the X direction and the resonance frequency $\omega_z$ in the Z direction.

$$X(t) = 2A\Omega \frac{1}{\omega x}\left[\frac{\omega_z}{\omega_x}\frac{1}{\sqrt{\left(1-\left(\frac{\omega_z}{\omega_x}\right)^2\right)^2+\left(\frac{1}{Q}\frac{\omega_z}{\omega_x}\right)^2}}\right]\sin(\omega_z t) \quad (1)$$

A: amplitude of vibrator
$\Omega$: angular rate
$\omega_X$: resonance frequency in a horizontal direction
$\omega_Z$: resonance frequency in a vertical direction
Q: mechanical quality The following equation (2) is obtained when the displacement $X(t)$ in the X direction is further differentiated with respect to the ratio R of resonance frequencies by assigning $R=\omega_Z/\omega_X$ to the equation (1).

$$X'(t) = 2A\Omega\frac{1}{\omega x}\left[\frac{-R^4+1}{\left(R^4+\left(\frac{1}{Q}-2\right)R^2+1\right)^{3/2}}\right]\sin(\omega_z t) \quad (2)$$

The equation (2) shows that the maximum displacement $X(t)$ is obtained at R=1. Specifically, it is found out that the maximum output is obtained by setting $\omega_Z=\omega_X$.

(Relationship between Generation Current and Ratio of Resonance Frequencies)

Figure 28:
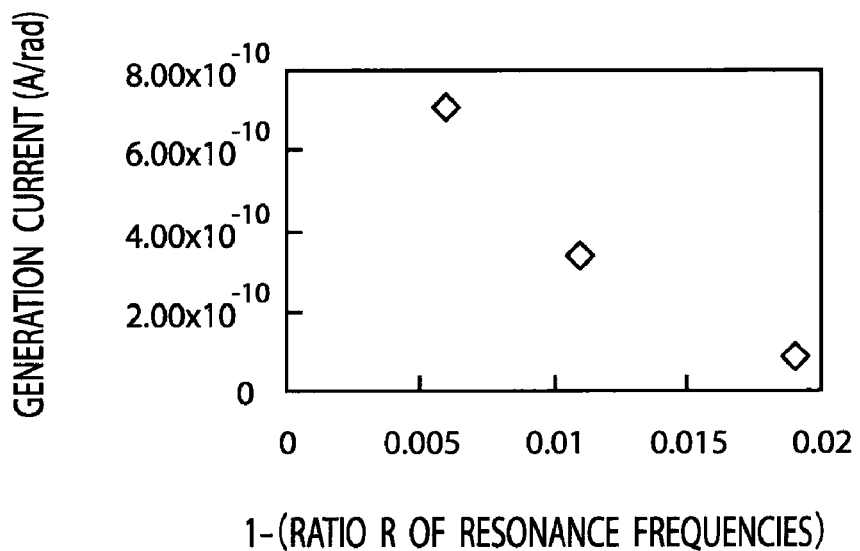
FIG. 28 is a graph showing a relationship between a generation current and a ratio of resonance frequency.

Description will be given of a result of checking, by a simulation, a relationship between a generation current to be outputted as a detection signal and the ratio R of resonance frequencies described above. FIG. 28 shows the result.

In order to enhance the reliability of the detection ability of the angular rate sensor, the generation current is preferably 100 pA/rad or more. Therefore, as shown in FIG. 28, the ratio R of resonance frequencies is preferably 0.98 or more.

(Relationship Between Resonance Frequency and Thickness of Vibrator)

Figure 29:
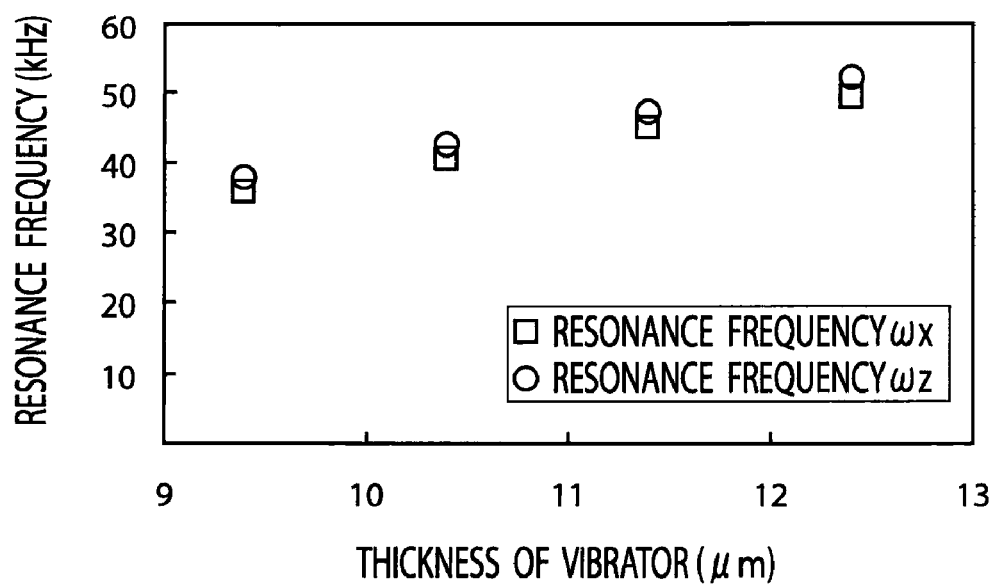
FIG. 29 is a graph showing a relationship between a resonance frequency and a thickness of a vibrator.

Description will be given of a result of checking, by an experiment, a relationship between the thickness of the vibrator and the resonance frequencies $\omega_X$ and $\omega_z$ in the X and Z directions. FIG. 29 shows the result. Note that, in order to set the resonance frequency $\omega_x$ in the X direction and the resonance frequency $\omega_z$ in the Z direction to be approximately equal to each other, the width of the detector is set to be about 22 μm and the width of the resonance frequency regulator is set to be about 5 μm.

As can be seen from FIG. 29, the resonance frequencies $\omega_X$ and $\omega_z$ can be regulated by the thickness of the vibrator. Moreover, it is also found out that the larger the thickness of the vibrator, the larger the resonance frequencies $\omega_X$ and $\omega_z$. Furthermore, it is found out that the resonance frequency $\omega_z$ undergoes a larger change due to the thickness of the vibrator than the resonance frequency $\omega_X$.

(Relationship Between Resonance Frequency and Width of Detector)

Figure 30:
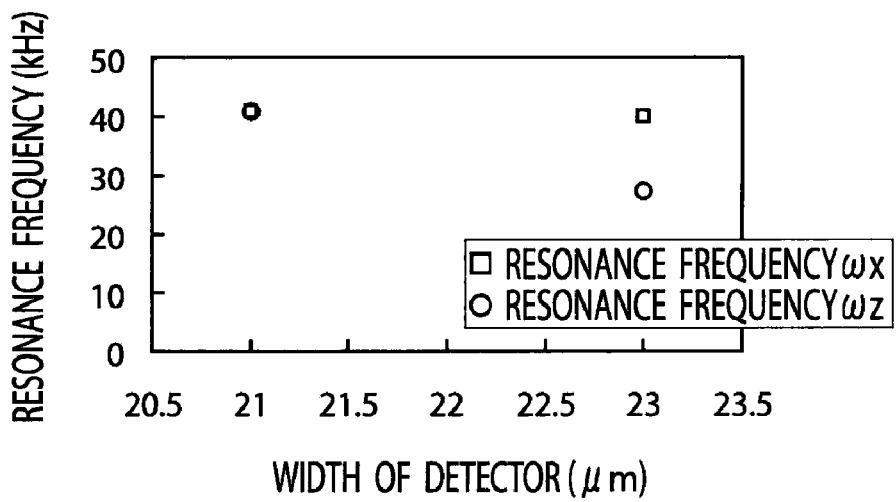
FIG. 30 is a graph showing a relationship between the resonance frequency and a width of a detector.

Description will be given of a result of checking, by a simulation, a relationship between the width of the detector and the resonance frequencies $\omega_X$ and $\omega_z$ in the X and Z directions. FIG. 30 shows the result.

As shown in FIG. 30, when the width of the detector is set to 21 μm, the resonance frequency $\omega_X$ in the X direction and the resonance frequency $\omega_z$ in the Z direction approximately coincide with each other. Meanwhile, when the width of the detector is set to 23 μm, the resonance frequency in the X direction is not very different from that when the width of the detector is 21 μm. However, when the width of the detector is set to 23 μm, the resonance frequency $\omega_z$ in the Z direction is significantly changed from that when the width of the detector is 21 μm. As a result, it is found out that the ratio R of resonance frequencies is largely shifted from "1" by setting the width of the detector to be 23 μm.

(Relationship Between Resonance Frequency and Width of Resonance Frequency Regulator)

Figure 31:
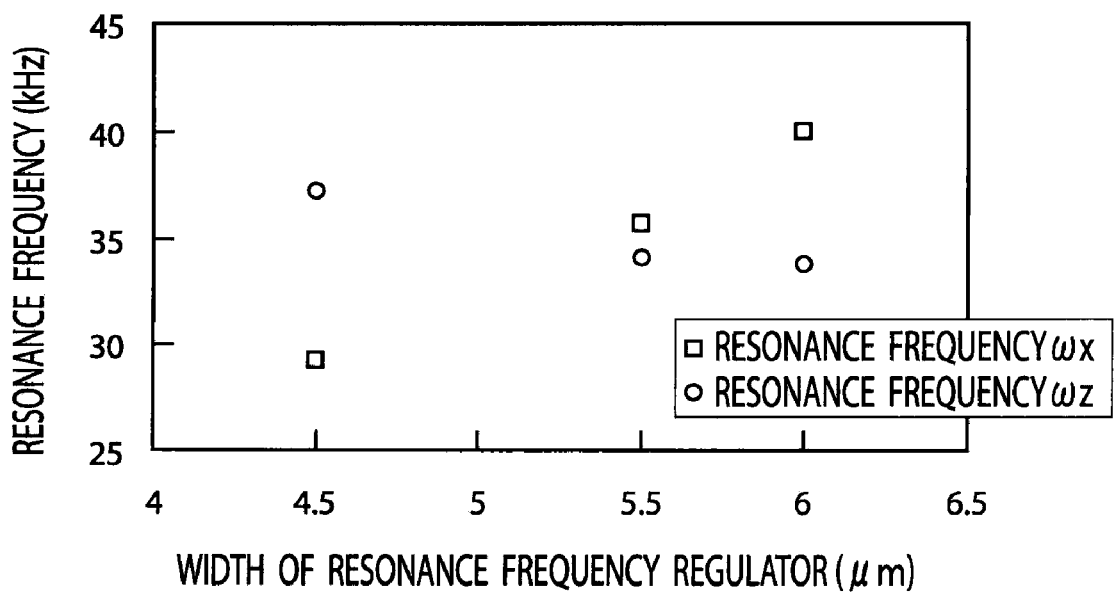
FIG. 31 is a graph showing a relationship between the resonance frequency and a width of a resonance frequency regulator.

Description will be given of a result of checking, by an experiment, a relationship between the width of the resonance frequency regulator and the resonance frequencies $\omega_X$ and $\omega_z$ in the X and Z directions. FIG. 31 shows the result. Note that the thickness of the vibrator is set to be 9.3 μm and the width of the detector is set to be 22 μm. The relationship is checked by changing the width of the resonance frequency regulator to 4.5 μm, 5.5 μm and 6.5 μm.

As can be seen from FIG. 31, both of the resonance frequencies $\omega_X$ and $\omega_z$ in the X and Z directions are changed by adjusting the width of the resonance frequency regulator. This shows that the ratio R of resonance frequencies can be regulated by the width of the resonance frequency regulator. Furthermore, it is also found out that the resonance frequency $\omega_X$ in the X direction and the resonance frequency $\omega_z$ in the Z direction are set to be approximately equal to each other when the width of the resonance frequency regulator is set to be 5.5 μm.

Fifth Embodiment

Figure 32:
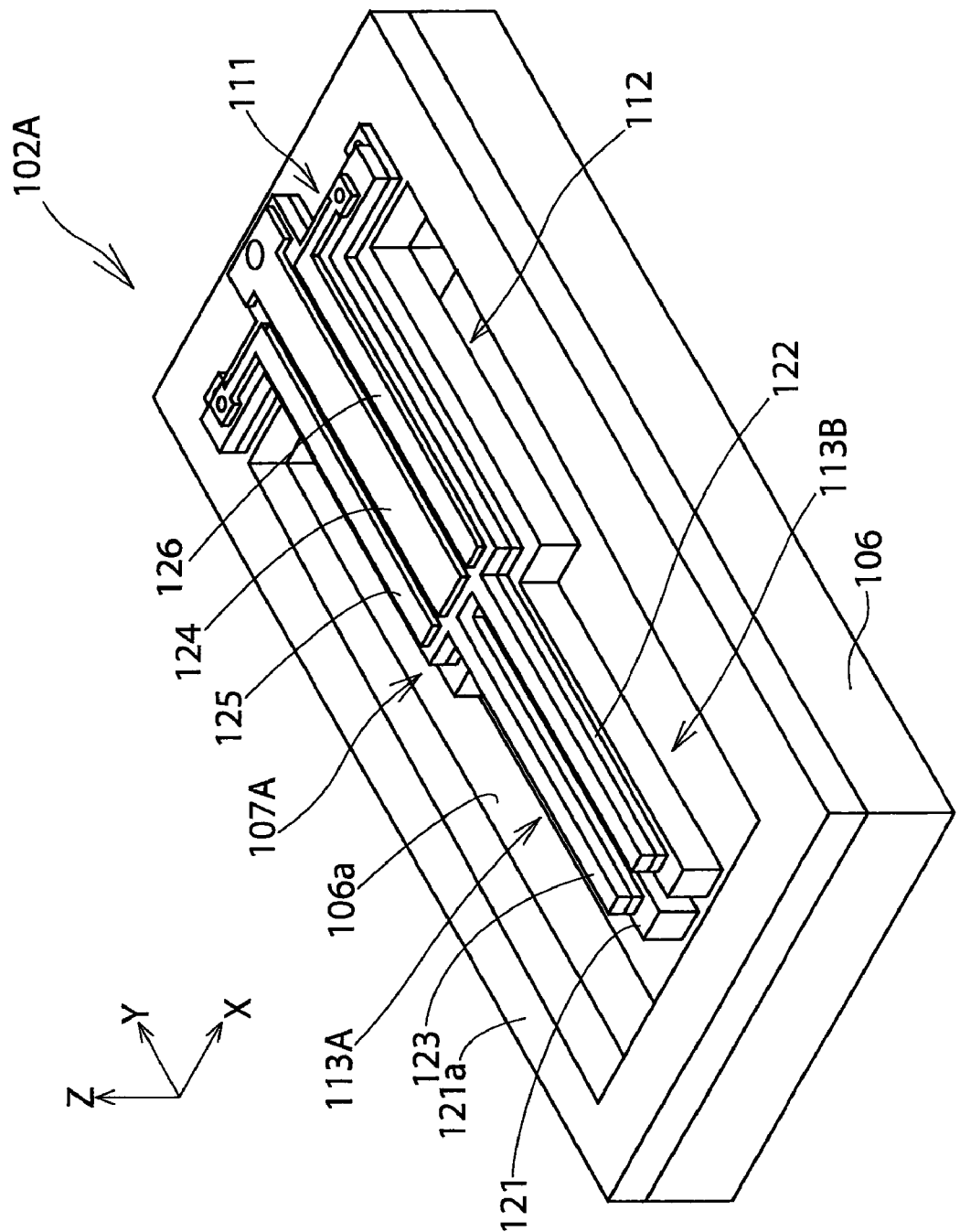
FIG. 32 is a perspective view of an element unit including a vibrator according to a fifth embodiment.

Next, with reference to the drawing, description will be given of a fifth embodiment in which the element unit according to the fourth embodiment described above is partially modified. FIG. 32 is a perspective view of an element unit including a vibrator according to the fifth embodiment. Note that the same components as those of the fourth embodiment are denoted by the same reference numerals and description thereof will be omitted.

As shown in FIG. 32, a vibrator 107A in an element unit 102A includes two resonance frequency regulators 113A and 113B. Note that the resonance frequency regulators 113A and 113B are formed to have symmetrical shapes at positions symmetric about a center portion in the width direction of a detector 112.

Sixth Embodiment

Figure 33:
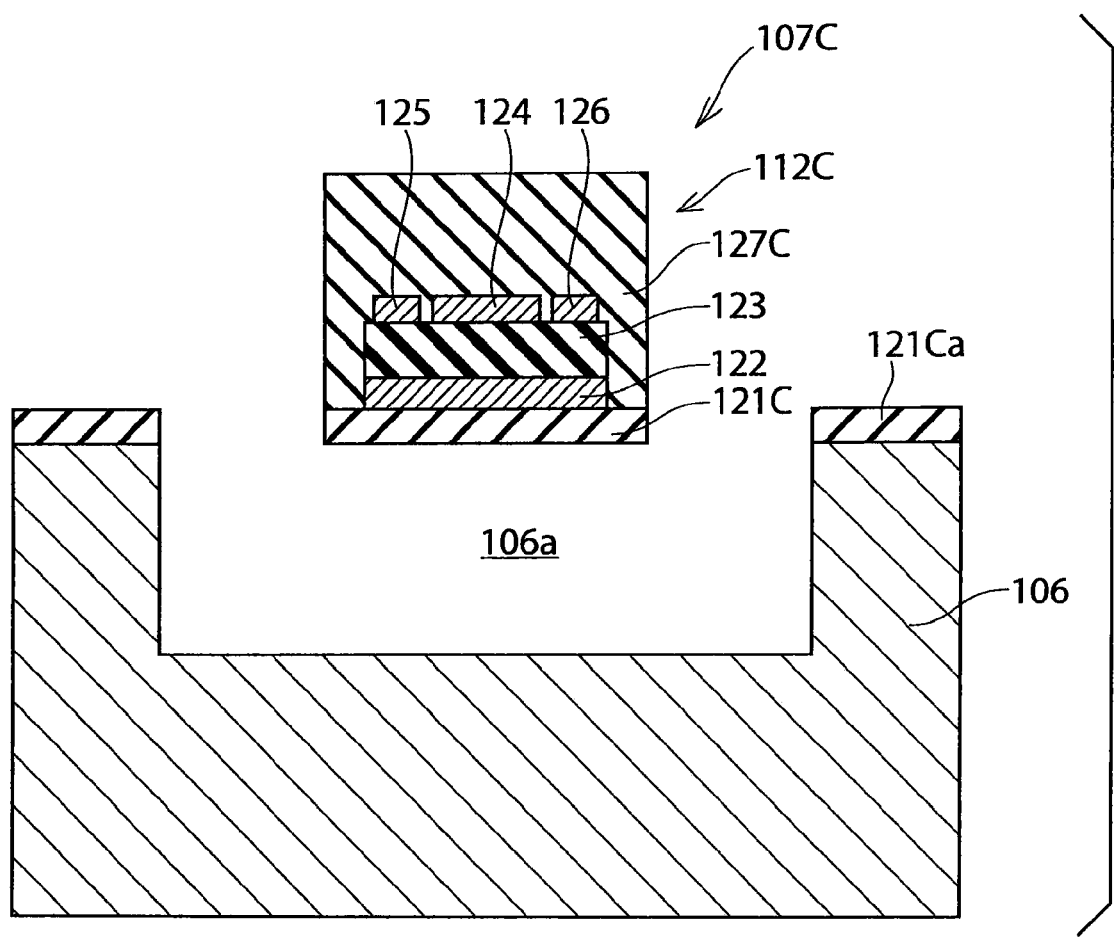
FIG. 33 is a cross-sectional view of a detector in a vibrator according to a sixth embodiment.

Next, with reference to the drawing, description will be given of a sixth embodiment in which the protective film according to the fourth embodiment described above is modified. FIG. 33 is a cross-sectional view of a detector in a vibrator according to the sixth embodiment. Note that the same components as those of the fourth embodiment are denoted by the same reference numerals and description thereof will be omitted.

As shown in FIG. 33, in the sixth embodiment, an upper protective film 127C of a detector 112C in a vibrator 107C is formed so as to have a thickness larger than those of lower protective films 121C and 121Ca. As an example, it is conceivable to form the upper protective film 127C in a thickness of several μm and to form the lower protective films 121C and 121Ca in a thickness of 0.5 μm to 1.0 μm. Note that, also in a resonance frequency regulator, the upper protective film is similarly formed so as to have a thickness larger than those of the lower protective films. In the vibrator 107C according to the sixth embodiment, the resonance frequency is significantly regulated by the upper protective film 127C.

Although the present invention has been described in detail by use of the embodiments, the present invention is not limited to the embodiments described in this specification. The scope of the present invention is determined by description of the scope of claims and scopes equivalent to the description of the scope of claims. Hereinafter, modified embodiments in which the above embodiments are partially modified will be described.

For example, the values, shapes, materials and the like described above can be changed accordingly.

Moreover, the shape of the support of the vibrator in each of the embodiments can be changed accordingly. For example, the support may be formed so as to intersect obliquely with the beam part.

Moreover, one driving electrode may be provided in the center portion in the width direction of the vibrator and a pair of detecting electrodes may be provided on both sides of the driving electrode.

What is claimed is:

1. An angular rate sensor comprising:
   a substrate; and
   a cantilever vibrator having a piezoelectric film, wherein the vibrator includes:
   a detector extending from the substrate and having a detecting electrode disposed on the piezoelectric film for detecting an angular rate and a pair of driving electrodes disposed on the piezoelectric film at positions symmetrical about the detecting electrode, the detector being capable of vibration, and
   a resonance frequency regulator provided at a front end of the detector, the resonance frequency regulator operable to regulate a resonance frequency of the detector.

2. The angular rate sensor according to claim 1, wherein the resonance frequency regulator has a linear shape extending in the same direction as that of the detector and the piezoelectric film is formed continuously from the detector.

3. The angular rate sensor according to claim 2, wherein a width of the detector is larger than a width of the resonance frequency regulator.

4. The angular rate sensor according to claim 2, wherein
   a width of the detector is larger than a thickness of the detector, and
   a width of the resonance frequency regulator is smaller than a thickness of the resonance frequency regulator.

5. The angular rate sensor according to claim 2, wherein the resonance frequency regulator is provided at a center portion in a width direction of the detector.

6. The angular rate sensor according to claim 1, comprising a plurality of the resonance frequency regulator, wherein the plurality of the resonance frequency regulator are symmetrical about a center portion of the detector.

7. The angular rate sensor according to claim 6 wherein the plurality of resonance frequency regulators have the piezoelectric film formed continuously from the detector, and a part of the piezoelectric film corresponding to an area of the plurality of the resonance frequency regulator is divided according to the number of the plurality of the resonance frequency regulator.

* * * * *